United States Patent [19]

Svinicki et al.

[11] Patent Number: 4,896,289
[45] Date of Patent: Jan. 23, 1990

[54] EXPANSION INTERFACE BOARD SYSTEM FOR CONNECTING SEVERAL PERSONAL COMPUTERS TO AN ELECTRONIC TYPESETTER CONNECTED TO A HOST PERSONAL COMPUTER

[75] Inventors: John M. Svinicki, Manchester; Steven Phillips, Tecumseh, both of Mich.

[73] Assignee: Xitron, Inc., Ann Arbor, Mich.

[21] Appl. No.: 79,794

[22] Filed: Jul. 29, 1987

[51] Int. Cl.4 .......................... G06F 3/00; G06F 3/09; G06F 3/12; G06F 3/13

[52] U.S. Cl. ................................ 364/900; 364/927.92; 364/927.99; 364/929.4; 364/929.5; 364/929.61; 364/930; 364/930.7

[58] Field of Search ...................... 276/1, 2, 3; 101/1, 101/45, 47; 364/200 MS File, 900 MS File, 471, 518, 519, 520

[56] References Cited

U.S. PATENT DOCUMENTS

| | | | |
|---|---|---|---|
| 3,593,300 | 7/1971 | Drinrell, Jr. et al. | 364/300 |
| 3,651,484 | 3/1972 | Smeallie | 364/200 |
| 4,051,326 | 9/1977 | Badagnani et al. | 364/900 |
| 4,145,739 | 3/1979 | Dunning et al. | 364/200 |
| 4,150,429 | 4/1979 | Ying | 364/200 |
| 4,151,590 | 4/1979 | Azegami | 364/131 |
| 4,245,308 | 1/1981 | Hirschman et al. | 364/200 |
| 4,282,583 | 8/1981 | Khan et al. | 364/900 |
| 4,415,986 | 11/1983 | Chadra | 364/900 |
| 4,441,163 | 4/1984 | Leikam et al. | 364/900 |
| 4,454,576 | 6/1984 | McInroy et al. | 364/200 |
| 4,547,846 | 10/1985 | Gottlieb | 364/138 |
| 4,556,959 | 12/1985 | Allen et al. | 364/900 |
| 4,573,120 | 2/1986 | Ichimiya et al. | 364/200 |
| 4,590,556 | 5/1986 | Berger et al. | 364/200 |
| 4,750,136 | 6/1988 | Arpin et al. | 364/514 |
| 4,752,870 | 6/1988 | Matsumura | 364/200 |

*Primary Examiner*—Archie E. Williams, Jr.
*Assistant Examiner*—Robert B. Harrell
*Attorney, Agent, or Firm*—Brooks & Kushman

[57] ABSTRACT

A personal computer/electronic typesetter interface includes an expansion board suitable for insertion into each of a plurality of personal computers functioning as page composition work stations, wherein one or more of the work stations is also connected for communication to an electronic typesetting machine. The expansion board includes logic for converting the data obtained in a preselected file from the coded format generated by the page composition work station to a second coded format recognized by the electronic typesetter to which the file is directed for output. The interface of the present invention also includes logic for continuously monitoring the status of the files in each of the queues, logic for interrupting the normal operation of the work station and displaying the first and second queues in response to a preselected command, and logic for allowing the operator to perform other file routing and queuing operations in response to other preselected commands. The interface of the present invention also preferably includes an offsite automatic initialization system which automatically downloads a pre-boot program into the memory on the expansion board, allowing the expansion board to initialize without the need for storing an initialization program in non-volatile memory on the expansion board.

2 Claims, 16 Drawing Sheets

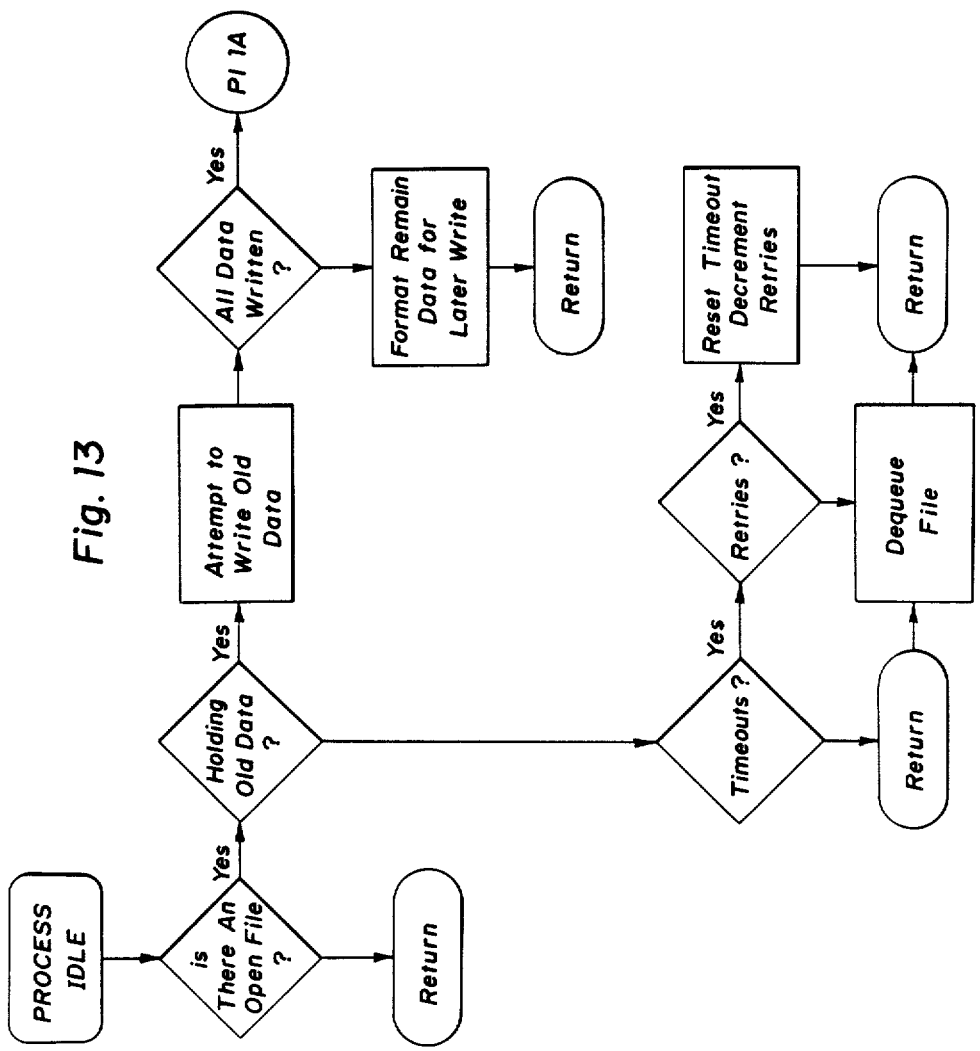

EXPANSION INTERFACE BOARD SYSTEM FOR CONNECTING SEVERAL PERSONAL COMPUTERS TO AN ELECTRONIC TYPESETTER CONNECTED TO A HOST PERSONAL COMPUTER

FIELD OF THE INVENTION

This invention relates generally to electronic typesetters, and more particularly to an expansion board for microcomputer page composition work stations which provides a network for routing text files from the page composition work stations to electronic typesetters connected to the system, monitors the status of files selected for output to the electronic typesetters, and automatically converts the coded format of the text files to the electronic typesetter, without interruption of normal processing of the page composition work stations.

BACKGROUND OF THE INVENTION

The advent of the electronic typesetting machines presented typesetters with the opportunity to prepare text to be typeset in an electronic format. The typesetting machine typically employs a code recognizable to the typesetting machine for all of the characters and for operations which might be input to the machine. A common typesetter code format, TTS, allows the typesetter to translate each data word input to the machine into a symbol or operation.

The advent of single-user (personal) computers prompted the development of many page layout and composition programs which may be utilized on personal computers or other dedicated page composition work stations to prepare and revise text for printing on a variety of electronic typesetters. These programs also create text files in a coded format. This coded format allows the particular typesetter connected to the work station to interpret each of the data words contained in a text file and output a character, or perform a printing operation, in response to each word or string or words. One coded format that is popularly employed by such programs is ASCII.

Special interfaces have been developed for receiving text files in one coded format, such as ASCII, translating those text files into another coded format recognizable by a typesetter machine, such as TTS, and outputting the converted text file to the typesetting machine. These interfaces allow text files to be developed on inexpensive personal computers and easily transferred for typesetting to electronic typewriting machines.

However, a single typesetting facility may have a plurality of different personal computers employing different software for preparing text files which may ultimately be typeset. Input of text files prepared on any one of the page composition work stations would require interface for direct connection to the typesetting machine as well as the capability of converting the coded format of the text file prepared by the word processor to the coded format recognizable by the typesetting machine.

Also, a typical installation may have one or more different typesetting machines into which it inputs text files prepared by various personal computer work stations. Physical transfer of a particular text file from one personal computer to another personal computer for input to a selected typesetting machine connected to the second personal computer interrupts the operation of both of the personal computers, resulting in an overall loss of efficiency in the operation of the facility.

It is an object of the present invention to provide an interface which allows for transfer of text files prepared on any one of a plurality of personal computers to a selected one of these personal computers for output to a typesetter connected to that personal computer.

It is another object of the present invention to provide an interface capable of performing code conversions from the first of several preselected coded formats corresponding to the text files formatted by personal computer page composition programs to a second preselected coded format corresponding to the code recognizable by the typesetting machine to which the text file is being output.

It is another object of the present invention to provide for an interface which monitors the status of any files queued for output to an electronic typesetting machine connected to a particular personal computer and which monitors the status of the text files queued for output from that personal computer to other personal computers for output to typesetting machines connected to those personal computers.

It is another object of the present invention to provide an interface including a microprocessor which employs the above described functions on a continuous basis without interrupting the normal processing of the personal computer.

It is another object of the present invention to provide an interface which performs the functions described above and which is embodied in a circuit board insertable into each of the personal computers in this system.

It is another object of the present invention to provide an off-site auto-boot mechanism for microprocessor-based expansion boards for personal computers, such as the interface of the present invention.

SUMMARY OF THE INVENTION

The personal computer/electronic typesetter interface of the present invention comprises an expansion board suitable for insertion in each of a plurality of personal computers in the system wherein one or more of the personal computers is also connected for communication to an electronic typesetting machine. The expansion board includes a microprocessor, a first input for receiving text files transmitted from other personal computers in the network to the host personal computer, a first output for transmitting text files from the host personal computer to one of the other personal computers in the system, a second output for transmitting files from the host personal computer or other personal computers to the electronic typesetter connected to the host personal computer, memory for storing some portion or all of the file to be transmitted via the first output in the first queue and storing some portion or all of the files to be transmitted via the second output in a second queue, and logic for converting the data contained in a preselected file from the coded format generated by the page composition work station used to generate the file to a second coded format recognized by the electronic typesetter to which the file is directed for output.

The interface of the present invention also includes logic for continuously monitoring the status of files in each of the first and second queues, logic for interrupting the normal operation of the personal computer and displaying the first and second text file queues in response to a preselected command, and logic for allowing the operator to change the position of a selected file in either of the first or second output queues in response to a second preselected command.

The interface resides on an expansion board suitable for insertion in each of the personal computers in the system. The software program that performs many of the functions of the interface is preferably stored on a floppy diskette or other suitable storage means which may be down-loaded to the expansion board at start-up. The processing associated with the interface of the present invention is then performed on the microprocessor-based expansion card, and is transparent to the operation of the personal computer's main processor.

The interface of the present invention also includes an off-site automatic initialization system which employs a pre-boot program, logic for establishing communication with the main board of the personal computer and means for downloading into the expansion board's memory any information necessary for the operation of the expansion board, a hardware loader located on the expansion board for receiving the pre-boot program one byte at a time from the main memory of the personal computer and storing the pre-boot program in a memory on the expansion board and means for sustaining the microprocessor on the expansion board in a "reset" condition until the pre-boot program is loaded onto memory on the expansion board.

Once the pre-boot program is loaded into memory on the expansion board, the microprocessor is placed in "set" condition and the microprocessor immediately accesses the expansion board's memory and begins to execute the pre-boot program. This method of "booting up" the expansion board system eliminates the need for non-volatile memory (such as EPROM, EEROM, PROM or ROM) on the expansion board. Any changes to be made to the initialization program may be effected by alteration of the pre-boot program software rather than physical replacement of a non-volatile memory chip.

Thus, the typesetting/personal computer interface of the present invention is a printed circuit board that fits in any one of the expansion slots of a conventional personal computer, such as the IBM PC, XT or other compatibles, for direct interconnection of each of the personal computers in the system. In addition, a direct interface between a particular (host) personal computer and a particular electronic typesetter is created by connecting an electronic typesetter to the output line on one of these expansion boards.

By interconnection of the personal computers, the interface of the present invention allows operators of any of the personal computers in the system to send a text file from memory in their own personal computer to a preselected host personal computer for transmission from the host personal computer to its associated electronic typesetter. The files transmitted to the host are queued in memory on the interface board, until they are output to the typesetter, thereby leaving the normal operation of the host undisturbed.

Moreover, the code converting capability of the system provides efficient conversion of any of a number of coded formats corresponding to the one or more page composition programs utilized by the different personal computers in the system into the coded format recognized by the particular electronic typesetting machine to which the file has been directed in this system.

Interconnection of the personal computers via the first input and first output on each of the expansion boards creates a local output network which allows up to 32 personal computers to share one or more electronic typesetters.

This stand-alone system runs as a background processor without interruption of the normal processing of the personal computers, so that, for example, page composition on the personal computers need only be interrupted to initiate the transmission of a text file for output to a particular electronic typesetter or to inquire as to the status of files in the queues.

The system provides pop-up windows which interrupt the display of the program currently running on the personal computer in response to a preselected command.

The status of the typesetter connected to a host computers can be checked as well, and modification of the order of the files in the queues can be effected with a series of key strokes. Also, the typesetter output can be started, paused or stopped at any time regardless of what program is running on the personal computer.

It will be appreciated by those skilled in the art that the personal computer/electronic typesetter interface of the present invention provides a network and interface which may be quickly and easily installed and provides efficient, noninterruptive access to one or more different electronic typesetters at the user's installation. Moreover, the code converting capabilities of the present invention allow for preparation of text files on a variety different page composition programs and routing of these files to a variety of electronic typesetters.

Also, the off-site automatic initialization system eliminates the need for non-volatile memory on the expansion board, thereby reducing costs. Thus, modification of the initialization program no longer requires a hardware modification—replacement of non-volatile memory—but instead may be effected by updating the system software on the main computer's storage device.

BRIEF DESCRIPTION OF THE DRAWINGS

FIG. 13 is a flow chart depicting the operation of the Process Idle routine;

FIG. 14 is a continuation of the flow chart depicting the operation of the Process Idle routine;

DESCRIPTION OF THE PREFERRED EMBODIMENT

Figure 1:
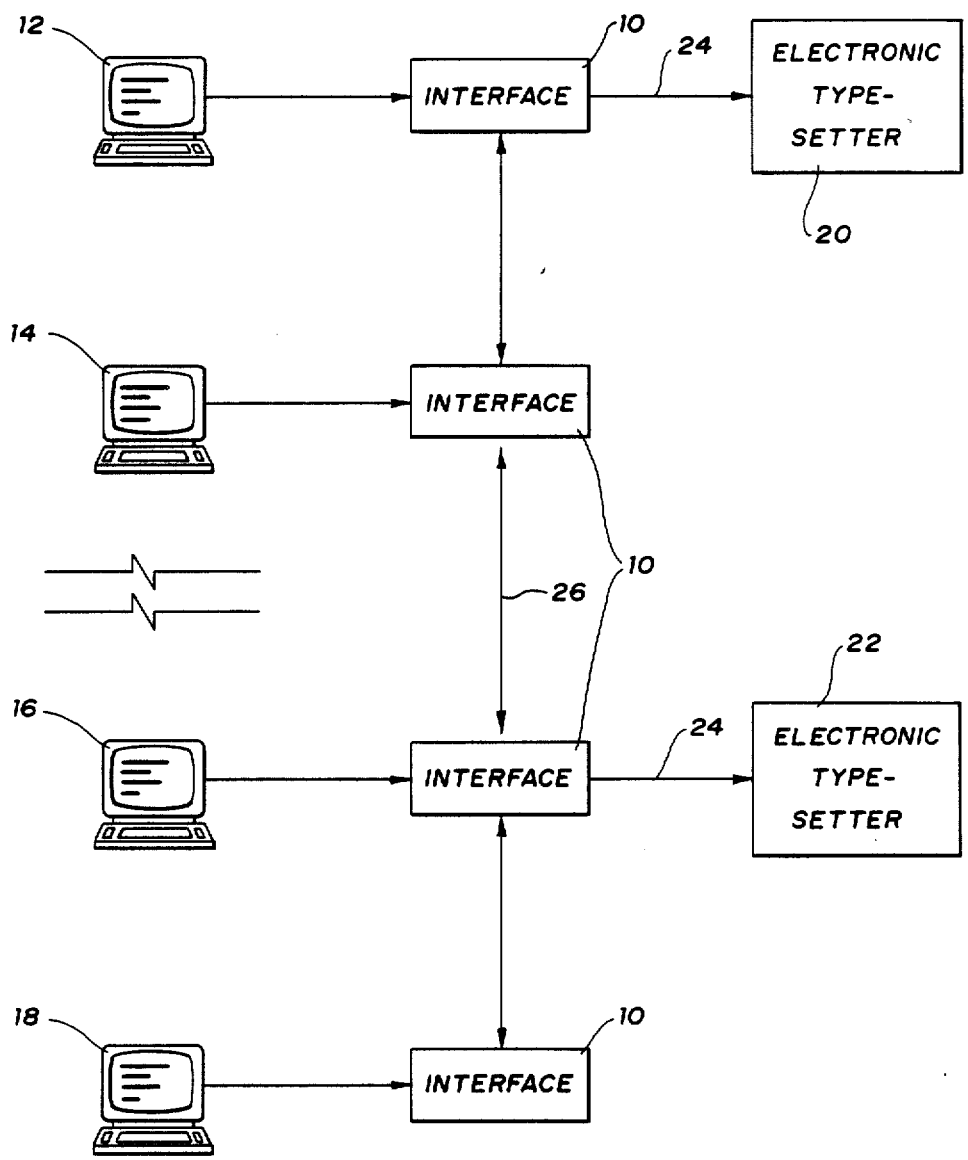
FIG. 1 is a block diagram of a typical installation utilizing the personal computer/electronic typesetter interface of the present invention.

Referring to FIG. 1, the personal computer/electronic typesetter interface 10 of the present invention allows for interconnection of up to 32 personal computers 12-18. If one or more of the personal computers 12-18 are connected to an electronic typesetting machine 20-22 via a communications link 24 which allows for transmission of text files from the personal computers 12 connected to typesetters 20 or 22 in a coded format recognizable by that electronic typesetter 20 or 22. The communication link 26 interconnecting each of the personal computers 12-18 forms a network over which text files may be transferred from one personal computer to another personal computer. As used herein, personal computer shall refer to any type of stand-alone, single-user computer having its own central processing unit (typically one or more microprocessors) and memory, such as the IBM PC or other commercially available compatibles. Hereinafter, each of the personal computers 12-18 on the network may also be referred to as "nodes" in the network.

Figures 2, 3:
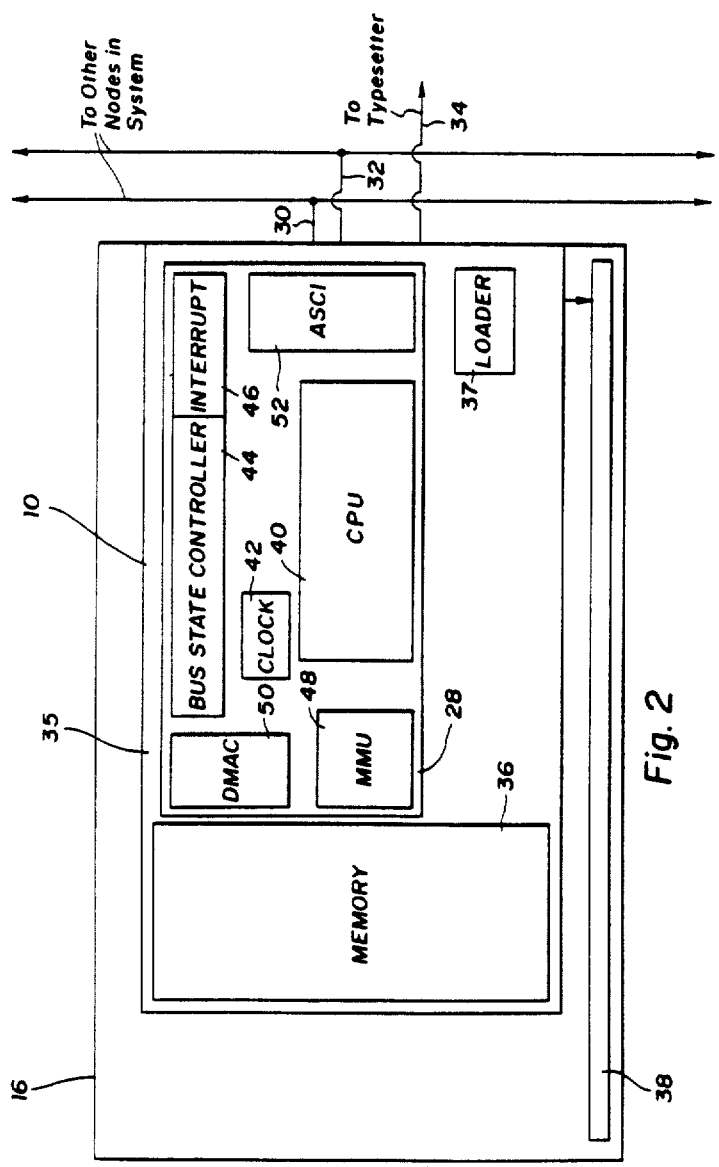
FIG. 2 is a block diagram of an expansion card including the interface of the present invention.
FIG. 3 illustrates how each of the partial drawings of FIGS. 21a–24b may be combined to form a complete schematic of a circuit board layout for the system of the present invention.

Referring to FIG. 2, the personal computer/electronic typesetter interface 10 of the present invention comprises an independently functioning system preferably in the form of a network interface board 35 (sometimes referred to as an "expansion card") which may be mounted on the main boards 38 of each of the personal computers 12-18 in the network. This board 35 includes a processor 28, a first input 30 for receiving text files transmitted over the network to this node 16, a first output 32 for transmitting text files from this node 16 to another node 12, 14 or 18 in the network a second output 34 for transmitting text files from this node 16, and indirectly from other nodes 12, 14 or 18 through this node 16 to the electronic typesetter 22 connected to this node 16, memory 36 or storing files to be transmitted via the first output in a first queue and for storing the files to be transmitted via the second output 34 in a second queue.

The network interface board 35 also includes logic for monitoring the status of the files in each of the queues, logic for interrupting the operation of the main board on the personal computer and displaying the queues of text files currently in memory 36 in response to a preselected command, and logic for converting the data contained in a selected file from a first coded format generated by the page layout and composition program associated with the personal computer a second coded format recognized by the typesetter 22 connected to the node 16 to which the text file is directed for output.

Hereinafter, any personal computer connected directly to an electronic typesetter, such as personal computers 10 and 16, shall be referred to as a "host" computer.

The interface of the present invention also preferably includes an off-site automatic initialization system having logic for establishing communications with the main board 38 of the personal computer and logic for downloading any information necessary for the operation of the network interface board 35, a hardware loader 37 for receiving the pre-boot program from memory 36 on the main board and storing the program in memory on the interface board 35, a switch for sustaining the microprocessor on the network interface board 35 in a "reset" condition until the pre-boot program is loaded, and logic for deactivating the switch thereby placing the processor 28 in "set" condition, causing execution of the downloaded pre-boot program. This pre-boot program then operates to download whatever program and/or data is required by the network interface board 35 from memory on the main board 38.

Referring to FIGS. 3 and 21a-24b, a preselected I/O address is decoded on the back-plane of the personal computer-I/O Bus 450. At start-up, while the microprocessor 360 is maintained in reset condition the personal computer initialization program writes a pre-boot program of up to 256K bytes, one byte at a time, to this preselected address. The value of each byte is then retreived from this address and written by the octal bus transceiver 426 into memory locations 0-255 on the expansion card memory 370-384. Once this pre-boot program is loaded, the microprocessor 360 is placed in set condition. At this point the microprocessor 360 automatically refers to memory locations 0-255 and executes the pre-boot program in those locations to download the additional program and/or data required by the interface from memory on the main board.

The principal components of the interface of present invention include a central processing unit (CPU) 40, a clock generator 42, a bus state controller 44, an interrupt controller 46, a memory management unit (MMU) 48, a direct memory access controller (DMAC) 50, an asynchronous serial communication interface (ASCI) 52, and sufficient random access memory 36, preferably 196K bytes, on the board 35 to allow for storage of some portion or all of each of the text files currently in each of the network and electronic typesetter queues. In the preferred embodiment, the Hitachi 64180 Processor includes all the above described components with the exception of the random access memory 36. The clock generator 42 uses an external clock input to generate the system clock. It is also prescaled to generate the timing for I/O and system support devices on the 64180 chip.

The bus state controller 44 controls bus activity. It performs external bus cycle wait state timing, reset, refresh and bus exchange functions. It also generates "dual bus" control signals for compatibility with peripheral devices.

The interrupt controller 46 monitors and prioritizes the interrupt sources. There are four external and eight internal interrupt sources. A variety of interrupt response modes can be programmed through the interrupt controller.

The MMU 48 translates the CPU logical memory address space of 64K into a physical memory address space of 256K. The MMU performs its memory mapping through an efficient "common area—blank area" scheme to preserve software object code compatibility while providing extended memory access.

The CPU 40 is microcoded to implement a full set of arithmetic and logical instructions as well as input/output instructions. The functions which the CPU are programmed to perform are discussed below in greater detail in connection with FIG. 4.

The DMAC 50 provides high speed mapped I/O transfer between I/O devices and the memory of the 64180. Because the direct memory access bypasses the MMU, the DMAC can directly access the full 512K bytes of physical memory address space. This allows data transfers to go across the 64K boundaries in memory.

The 64180 processor also has its own built-in communication chip, the ASCI 52, containing two universal asynchronous receiver/transmitters (UARTS). The ASCI 52 contains registers that handle functions such as data formatting, data transmission, data reception, monitoring the status of its own registers, detecting data carrier signals, selecting the band rate, enabling registers to receive interrupts, sensing overrun, parity and framing errors. The ASCI 52 also controls the two communication channels between the network interface board 35 and the main processor on the personal computer, enabling the receiver and transmitter, disabling the clock, processing modem control signals, and setting flags to configure the 64180 in a multiprocessor mode so that several interface boards 35 can operate on a network sharing the same serial date.

The interface of the present invention also preferably includes a hardware loader 40 which in conjunction with a pre-boot program, initializes the interface board at start-up.

FIGS. 3 and 21a-24b illustrates a detailed schematic of the interface board 35 of the present invention.

As will be appreciated by those skilled in the art, each of the hardware components utilized in the construction of the interface board 35 of the present invention are commercially available. The following chips are available from several suppliers including Fairchild, Inc., Hitachi, Ltd., National Semiconductor, Inc., Texas Instruments, Inc., and Ignetics, Inc.:

1. 8 Input Positive NAND Gate 300, Chip type 74LS30.
2. Hex Schmitt Trigger Inverters 302-310, chip type 74LS14.
3. 3-To-8 Line Decoder/Demultiplexer, 312-314, chip type 74LS138.
4. Quadruple 2-Input Positive AND Gate 316-336, chip type 74LS08.
5. Hex Inverter 338-344, chip type 74SO4.
6. Dual D-Type Positive Edge Triggered Flip-Flops With Present and Clear, 346, 348, chip type 74LS74.
7. Dual D-Type Positive Edge Triggered Flip-Flops With Preset and Clear, 350-358, chip type 74LS74.
8. 8-Bit Microprocessor 360, chip type 64180 (this microprocessor is available only from Hitachi).
9. Octal Bus Transceivers and Registers 362, chip type 74LS652. (This chip is available from Monolithic Memories, Inc.)
10. Quad 2-To-1 Line Data Selectors/Multiplexers 365-368, chip type 74LS157.
11. 256K×1 Dynamic Ram 370-384, part number 256-12.
12. Dual 4-Bit Binary Counters 386, chip type 74LS393.
13. Octal D-Type Flip-Flops 388, chip type 74LS374.
14. Hex D-Type Flip-Flops 390, chip type 74LS174.
15. Quad RS-422 Line Receiver 392-402, chip type 3486.
16. Quad RS-422 Line Driver 404-424, chip type 3487.
17. Octal Bus Transceiver 426-430, chip type 74LS245.
18. Hex Bus Drivers 32, chip type 74LS367.
19. Optical Isolator 434, chip type 6N136. (Available from Hewlett-Packard, Inc. and TRW, Inc.)

Figure 4:
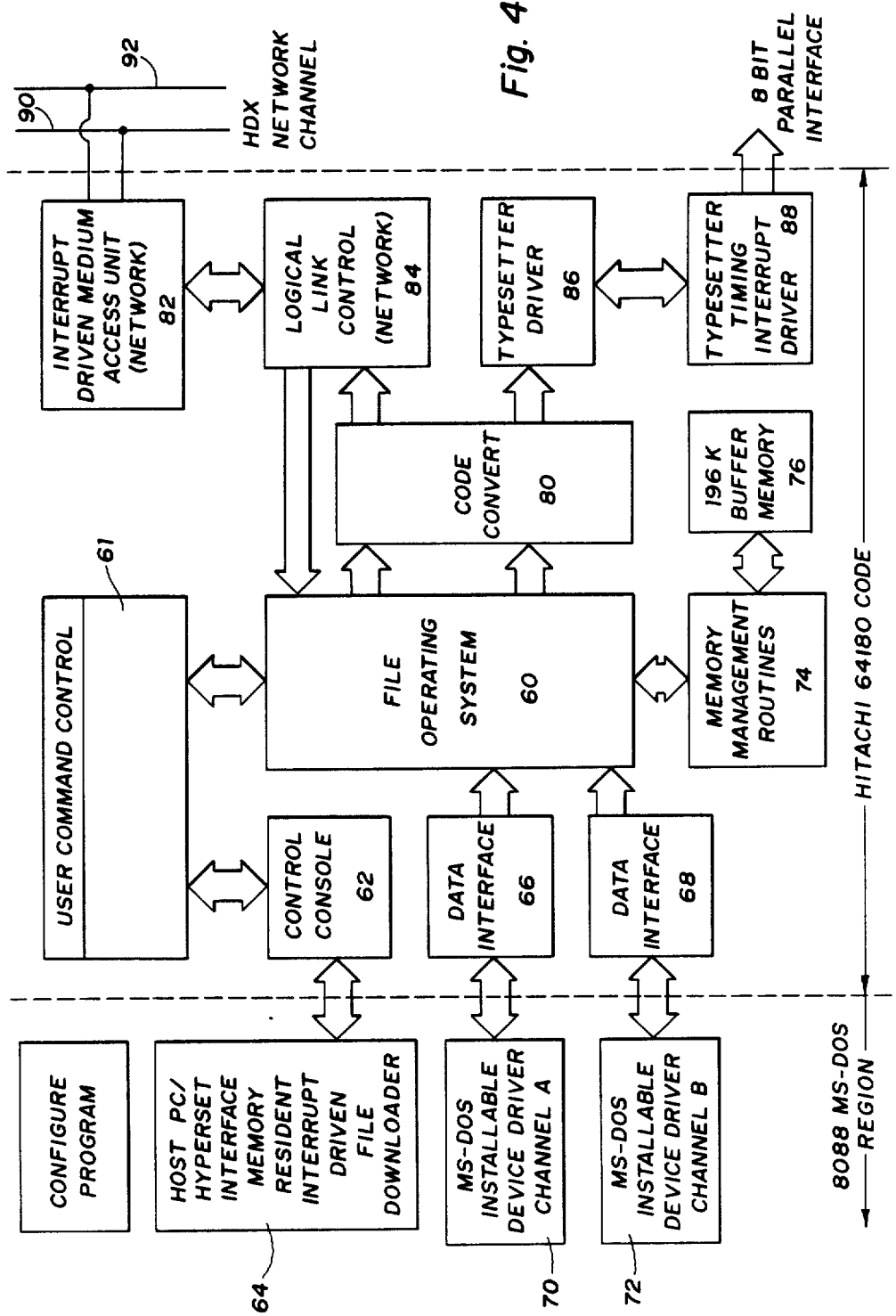
FIG. 4 is a block diagram showing the functional capabilities of the system of the present invention.

The above described hardware is suitably programmed to perform the basic functions of the interface of the present invention illustrated in FIG. 4. The general operating system, referred to as the File Operating System (FOS) 60 performs the functions of interrupting the normal processing of the personal computer in response to a preselected command from the operator, allowing the operator to execute any one of eight interface system commands, view the directory of text files resident in the memory of the host, and view the current status of each of the files currently in the output queues.

The control console 62 communicates with the memory-resident interrupter from file downloader 64 on the host computer.

A pair of data interfaces 66 and 68 are connected for communication to device drivers 70, 72 on the host computer. The device drivers are preferably the native operating system installable device drivers that are provided on personal computers such as the PC-DOS device drivers on the IBM PC.

Memory management routine 74 interacts with the FOS 60 and the 196K memory 76 on the interface board, insuring that files downloaded from the host computer and files received from the other nodes on the network are properly stored and assigned to one of the two output queues.

The code convert logic 80 analyzes each byte of data in a particular text file prior to that file being dispatched to another node on the network or out to the electronic typesetter connected to this node. The code conversion preferably utilizes one or more conversion tables which contains specific rules for converting certain input data strings to specified output data strings. In particular, the conversion tables replace strings of one to five characters on input with one to sixty-four characters for output to enable the electronic typesetter to perform the described functions. The code converter 80 also deletes page layout and composition codes and conventions that are unnecessary to typesetting, such as page breaks, format lines at the top of screens, tab set ups, double spacing, and other commands. These code tables are modifiable by the operator so that conversions from or to unique devices can be custom programmed. The ability to modify the conversion tables also allows the operator to encode his text files with special characters that enable the graphics capabilities of the operator's typesetter or allow the operator to perform complex formatting tasks automatically.

The IDMAU 82 and the Logical Link Control 84 perform the networking functions for the system. Any of a number of commercially available networks, may be utilized for this function. However, in the preferred embodiment of the invention a multiple access collision detection (MACD) network consisting of a half duplex communication link employing block data transmission of files among 32 nodes over conventional, low cost RJ-11 telephone cabling. Distances of up to 500 feet between work stations are easily possible. The interface boards 35 on each of the nodes are interconnected by the telephone cabling through a miniature 6-position RJ-11 modular plug. Data is sent over the network in blocks of up to 128 bytes, including data which identifies the destination node, source node, and number of bytes in the data packet, and a checksum code to ensure that the data is what it purports to be.

All nodes on the network are simultaneously receiving data transmitted from a particular node. The IDMAU 82 and Logical Link Control 84 receive the data transmitted on the network and determine whether that data is intended for that node. If the data is intended for that node it is received and processed by the FOS and memory management routines for storage in the memory 76 on the interface board at that node.

The typesetter driver 86 and typesetter timing interrupt driver 88 together provide the communications link between the interface board and an electronic typesetter or other output device connected to that node through an 8 byte parallel interface. A 37 pin input plug on the interface board may be custom configured by the operator to work with a variety of commercially available electronic typesetters and output devices.

SYSTEM OPERATION

In operation, the system of the present invention performs its basic functions of transmitting text files to the electronic typesetter to which it is connected and to other nodes on the system and receiving text files from other nodes on this system without interruption of the normal operation of the personal computer.

Figure 5:
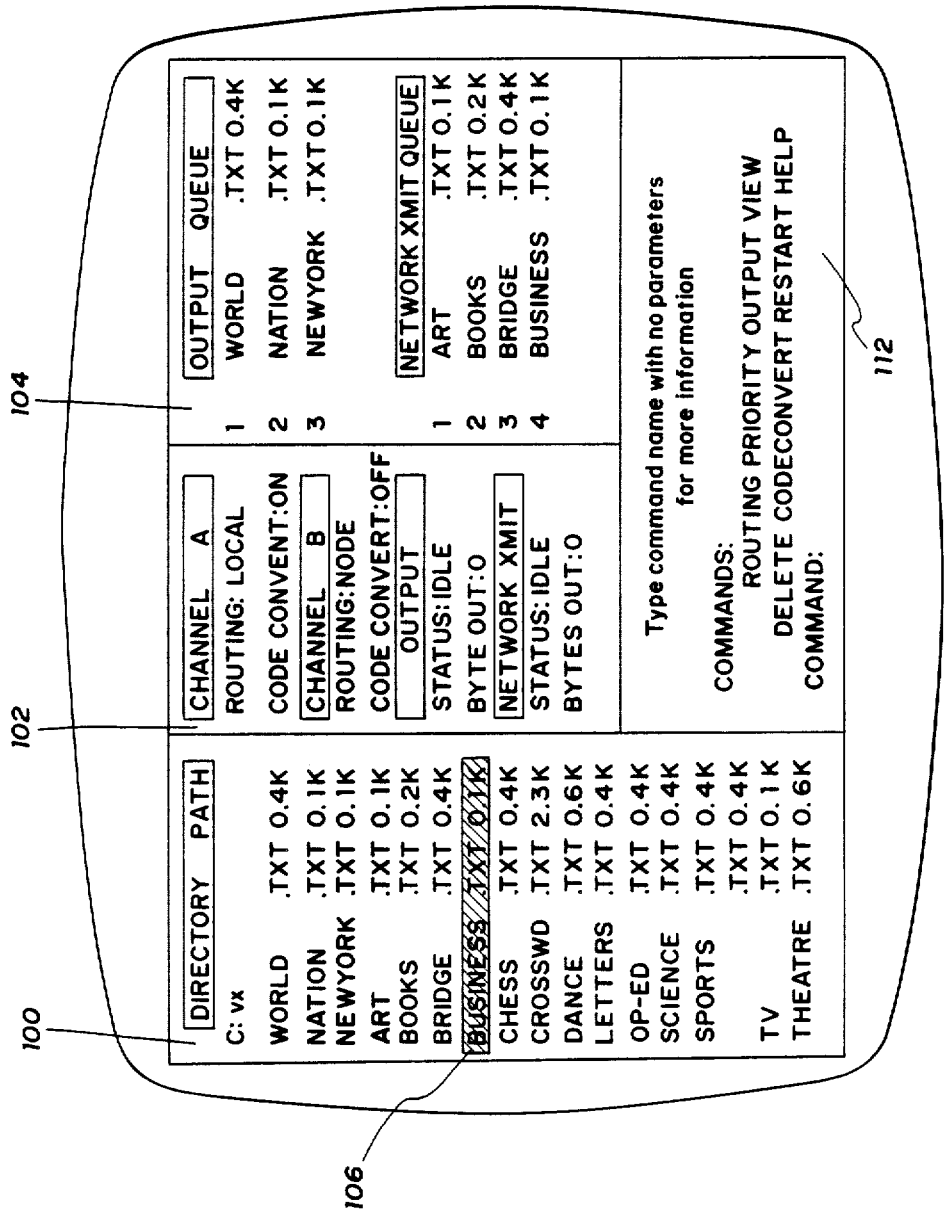
FIG. 5 illustrates the four pop-up windows displayed on command by the system of the present invention.

The operator must press down on a preselected key or keys to invoke the interface software from its background residence. As shown in FIG. 5, one or more of the four pop-up windows 100-104, 112 will then appear on the screen, superimposed on the display generated by the program currently running on the main board of the personal computer.

The directory display window 100 displays a listing of the files in the current logged-on disk directory. When this directory appears, one file 106 is highlighted in a reverse video bar. This reverse video bar indicates that this file may be selected for output to either of the two channels. The operator may scroll through this directory by pressing one or more selected keys, preferably the "cursor up" and "cursor down" arrow keys. This scrolling action allows the operator to highlight different files, thereby targeting those files for output.

The channel status window 102 contains the routing assignments for each of the two channels A & B, the code conversion status of both channels, and the data flow status of the output and network transmit channels.

The queue status window 104 displays the contents of the output queue—that is, the queue of files designated for output to the electronic typesetter connected to this node. The queue status window 104 also displays the contents of the network transmit queue—that is, the queue of files designated for output to other nodes on the network.

A file may be placed in either of the output queue or the network transmit queue by pressing one or more preselected keys corresponding to those queues. In the preferred embodiment, one of the special function keys on the personal computer keyboard is predefined for output to channel A and other function key is designated for output to channel B, with each of channels A and B being assigned as either the output channel or network transmit channel. Activation of one of these keys designates that the file highlighted in reverse video in the directory display window for placement into the appropriate queue.

The operator command window 112 displays each of the eight commands that are available to the operator. The names and functions of these commands are set forth below:

CODECONVERT—This command selects the code conversion table for either of the two output channels.

DELETE—This command deletes a specified file from either of the output or network transmit queues.

HELP—This command provides the operator with information about the other commands.

OUTPUT—This command allows the operator to control the electronic typesetter connected to this node by placing the output port in an on-line or off-line state.

PRIORITY—This command allows the operator to change the position of a file in either of the output queue or network transmit queue.

RESTART—This command allows the operator to stop a job that is in the process of being output through either the output queue or the network transmit queue and restart transmission of that file from the beginning.

ROUTING—This command sets the destination of either of the output channels. The destination can either be a number of any one of the other nodes on the network, or to the electronic typesetter connected at this node.

VIEW—This command allows the operator to display the contents of any file in either of the output or network transmit queues.

FILE OPERATING SYSTEM (FOS)

Figure 6:
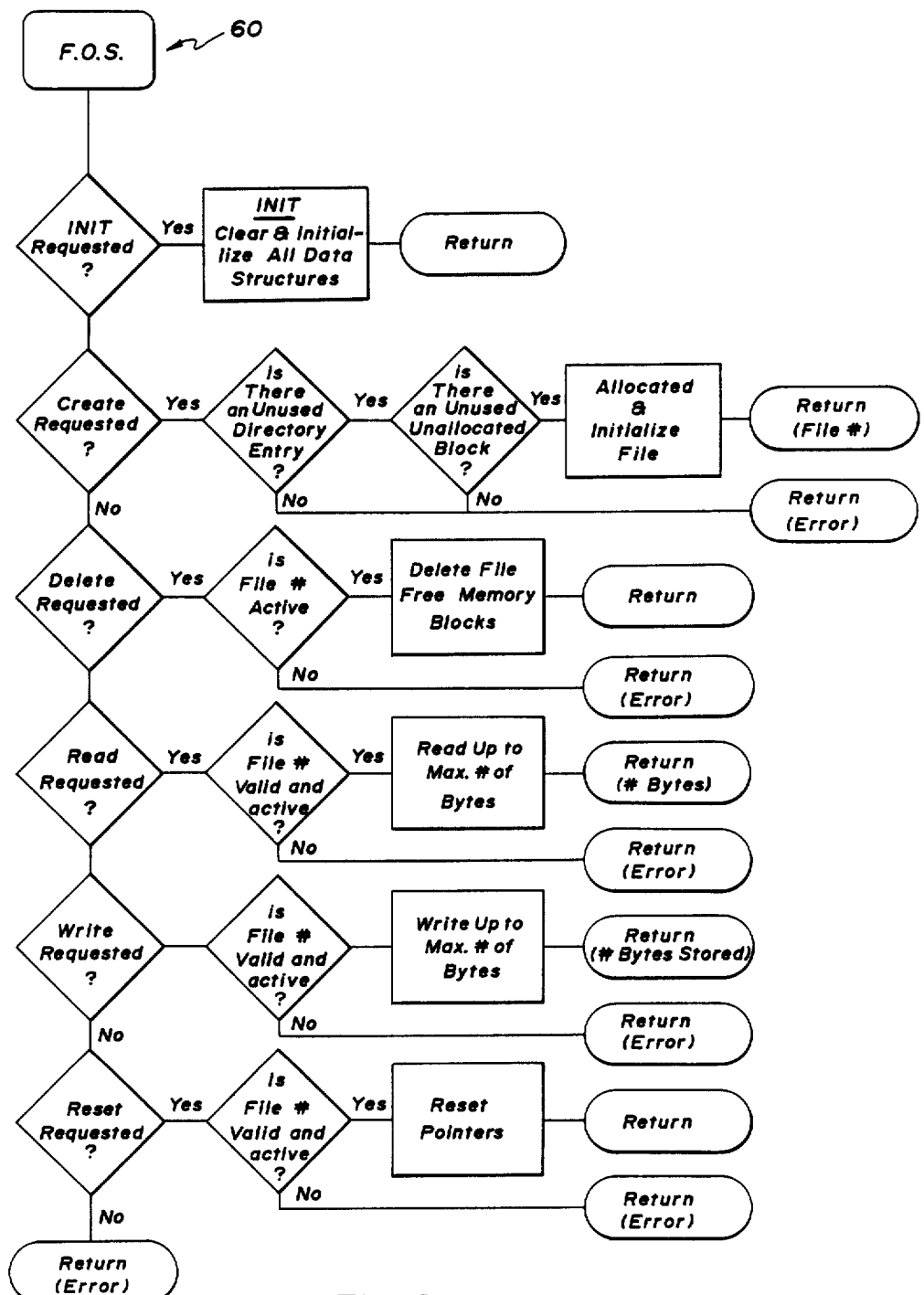
FIG. 6 is a flow chart depicting the operation of the File Operating System.

Referring to FIGS. 4 and 6, FOS employs six basic routines which are utilized by the operator (indirectly through the use of the operator commands at the user command control 61), each of the data interfaces 66 & 68, the Logical Link Control 84 and the typesetter driver 86 to perform various operations on the text files processed by the system. FOS repeatedly checks for calls by any of the above-identified segments of the system to any of its six routines.

If INIT has been requested, FOS clears all of the buffers in memory 76 and initializes the pointers in the memory management routine 74 in preparation for operation of the system. This FOS command is typically utilized only at start-up.

If CREATE is requested, FOS determines whether there is an available directory entry for the file. If there is an available directory entry FOS then determines whether there are any unallocated blocks in the board's memory 76. If there are unallocated blocks in memory FOS then opens a file in the directory, allocates one 4K byte block of memory for the file, and returns the name (or number) assigned to the file to the source that requested a CREATE. If there is no unused directory entry or if there are not unallocated blocks the CREATE routine will return an error message indicating this condition.

If DELETE is requested, FOS determines whether the indicated file number is valid and active. If the file is valid and active, FOS deletes the file and frees each of the memory blocks used by that file for other use. If no valid, active file is found, DELETE returns an error message indicating that there is no file to be deleted.

If READ is requested, FOS checks to see if the file number of the file to be read is valid and active. If this file number is valid and active FOS retrieves the maximum number of bytes then returns to the source of the read request.

If no file number is valid and active on a READ call, FOS returns an error message indicating that condition.

If write is requested, FOS again checks to see if the indicated file number is valid, active and open. If the requested file number is valid, active and open, FOS writes up to the maximum number of bytes into the file and returns with a value indicating the number of bytes stored.

If the indicated file number is not valid, active or open FOS, returns an error message indicating that condition.

If RESET is requested, FOS determines if the indicated file number is valid and active. If the indicated file number is valid and active FOS resets the pointers and returns.

If the requested file number is not valid and active, FOS returns with an error message indicating that condition.

If none of the above commands (INIT, CREATE, DELETE, READ, WRITE or RESET) are indicated FOS returns an error message indicating that condition.

It should be noted that other subroutines in the system of the present invention may call FOS to implement one or more of the above described commands. In particular, Process Transmit and Process Receive (each described in further detail below) call the FOS READ and WRITE commands to access data stored in memory during the performance of receipt and transmission of that data over the network.

MACD NETWORK

The system of the preferred embodiment employs a Multiple Access Collision Detection Network which provides for interconnection of up to 32 nodes over conventional RJ-11 telephone cables. As shown in FIG. 4, the network transmits information over an RS-422 party line including a pair of transmission lines 90, 92. The transmission lines 90, 92 operate as a differential pair with one line transmitting high when the other is transmitting low. The use of differential pairs allows for reliable transmission on lines 90, 92 for up to 500 feet in length, in contrast to single transmission lines having a maximum effect of transmitting lengths of about 25 other networks feet.

The IDMAU 82 and logical link control 84 are the functional blocks that handle the network functions on the board. The IDMAU 82 contains 8 128 byte buffers, utilized for transmitting and receiving data over the network channels and controls the UARTs for reception and transmission of the data.

While the operation of the NACD network will become apparent from the above description of FOS and the following discussion of the Logical Link Control, Process Receive, Process Transmit and Process Idle subroutines, it will become apparent to those skilled in the art that the system of the present invention may employ other commercially available open-ended ring-type networks.

LOGICAL LINK CONTROL (LLC)

Figure 7:
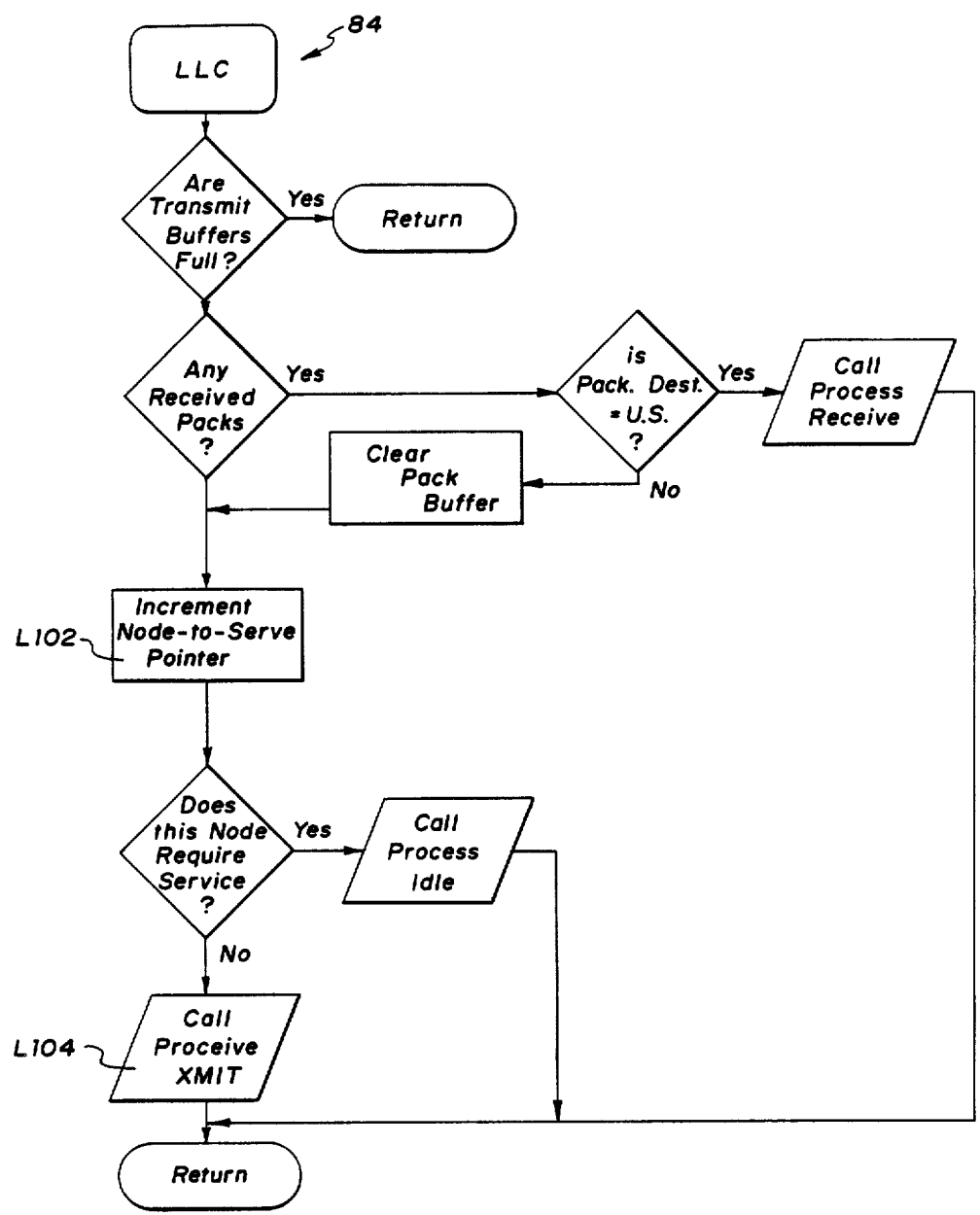
FIG. 7 is a flow chart depicting the process employed by the Logical Link Control routine of the present invention.
Figure 8:
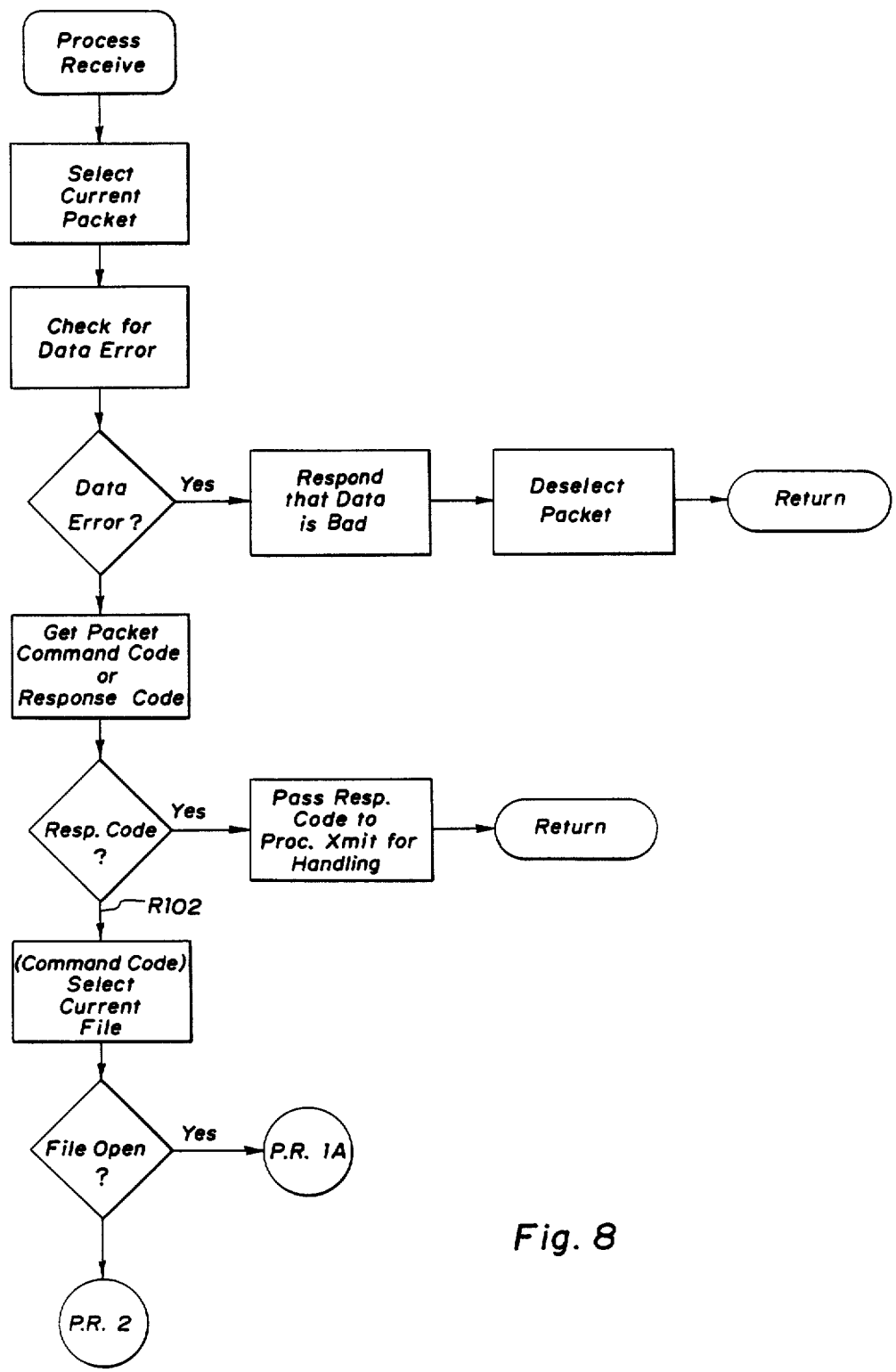
FIG. 8 is a flow chart depicting the operation of the Process Receive routine.
Figure 9:
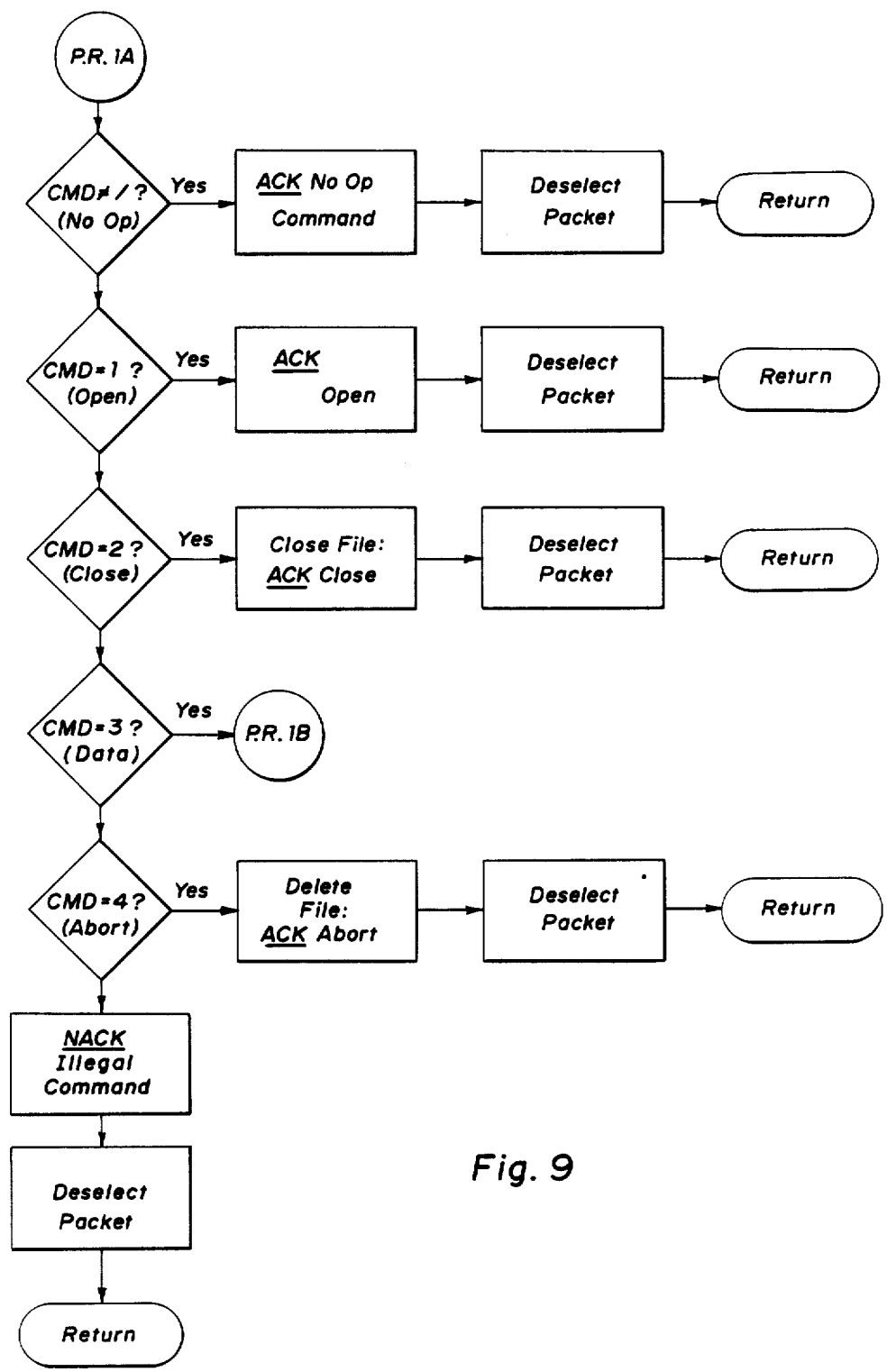
FIG. 9 is a continuation of the flow chart depicting the operation of the Process Receive routine.
Figure 10:
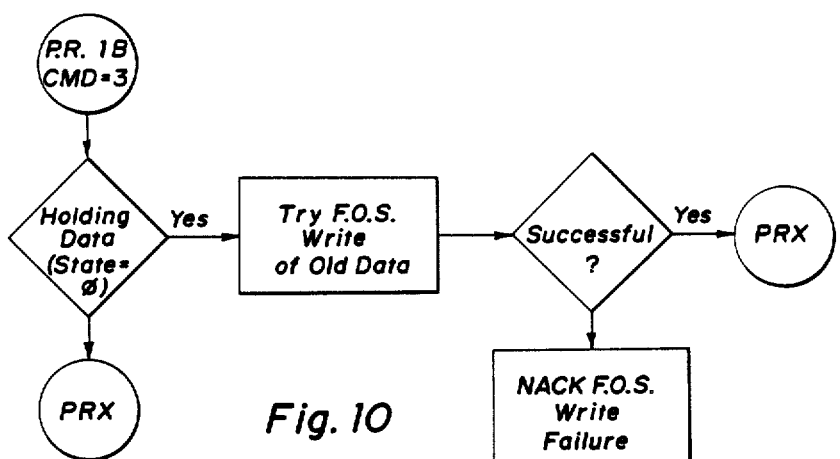
FIG. 10 is a continuation of the flow chart depicting the operation of the Process Receive routine.
Figure 11:
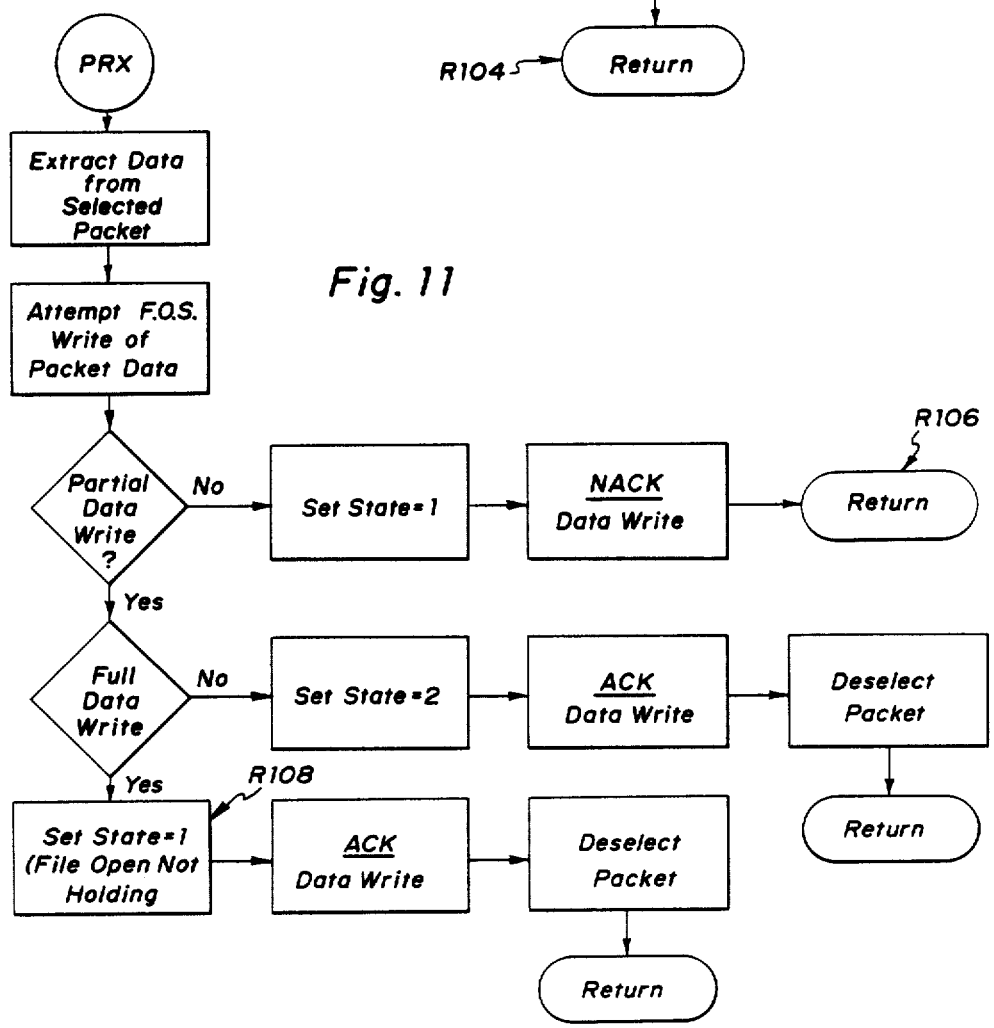
FIG. 11 is a continuation of the flow chart depicting the operation of the Process Receive routine.
Figure 12:
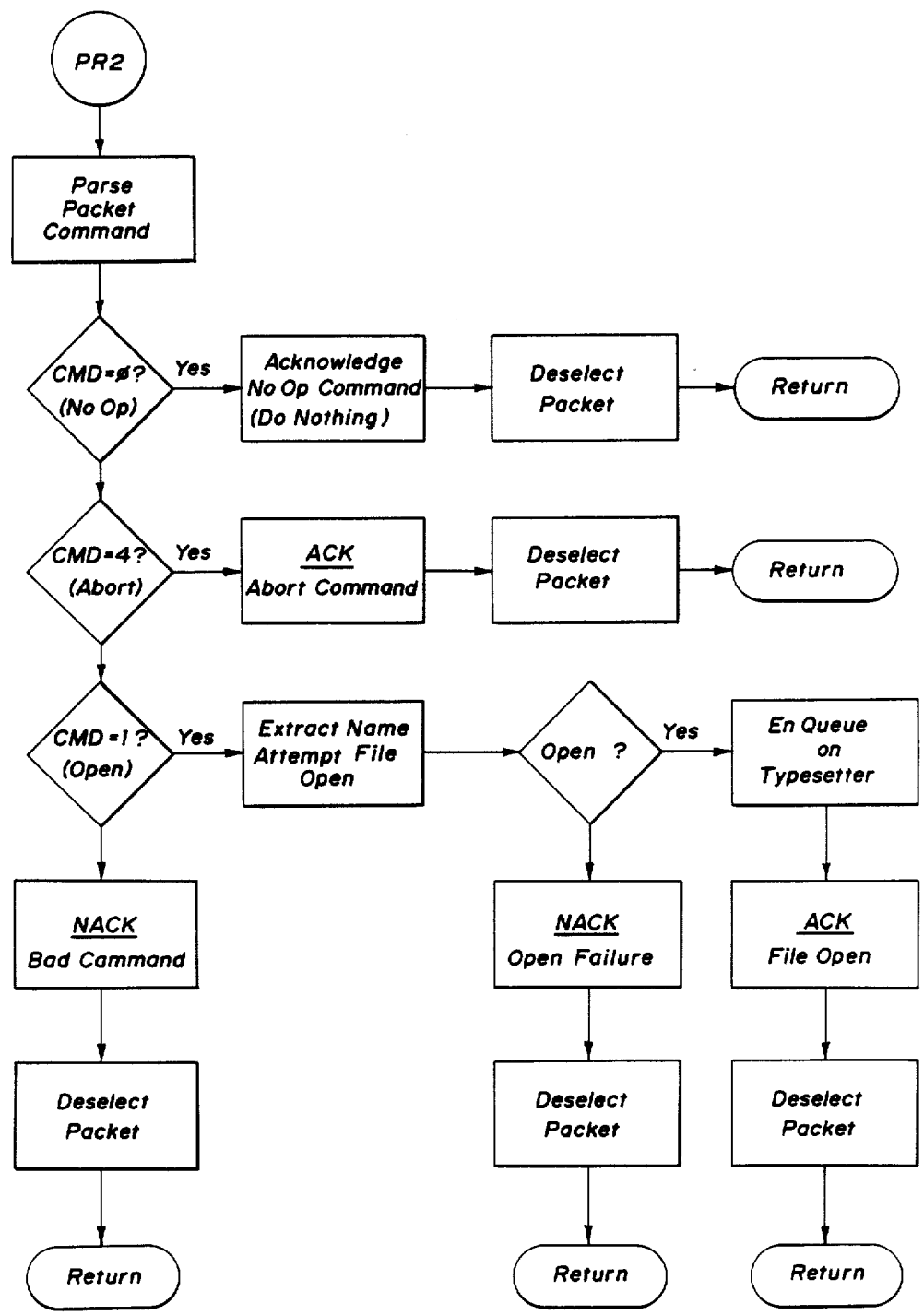
FIG. 12 is a continuation of the flow chart depicting the operation of the Process Receive routine.
Figure 15:
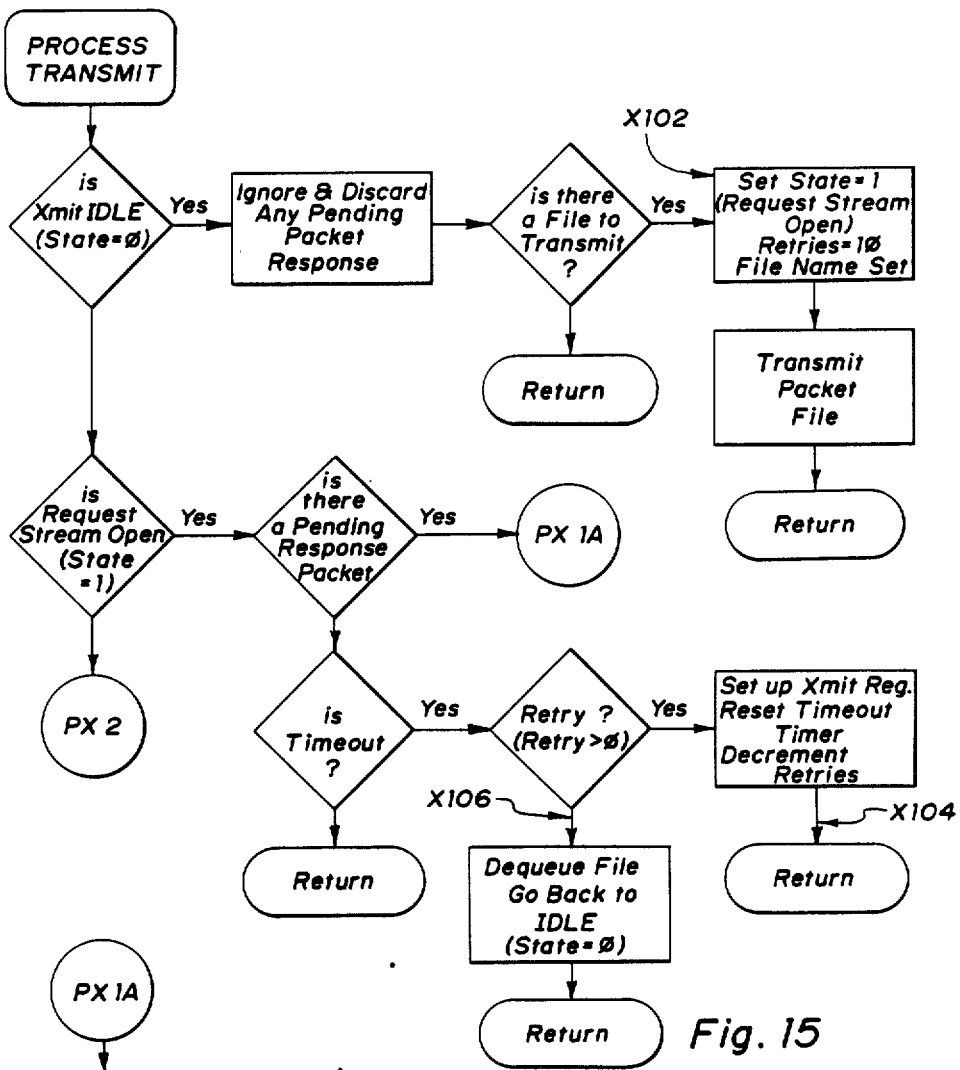
FIG. 15 is a flow chart depicting the operation of the Process Transmit routine.
Figure 16:
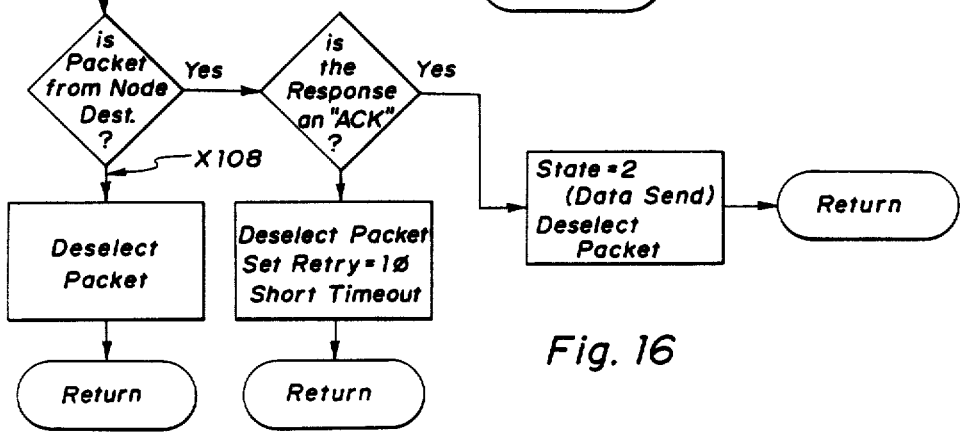
FIG. 16 is a continuation of the flow chart depicting the operation of the Process Transmit routine.
Figure 17:
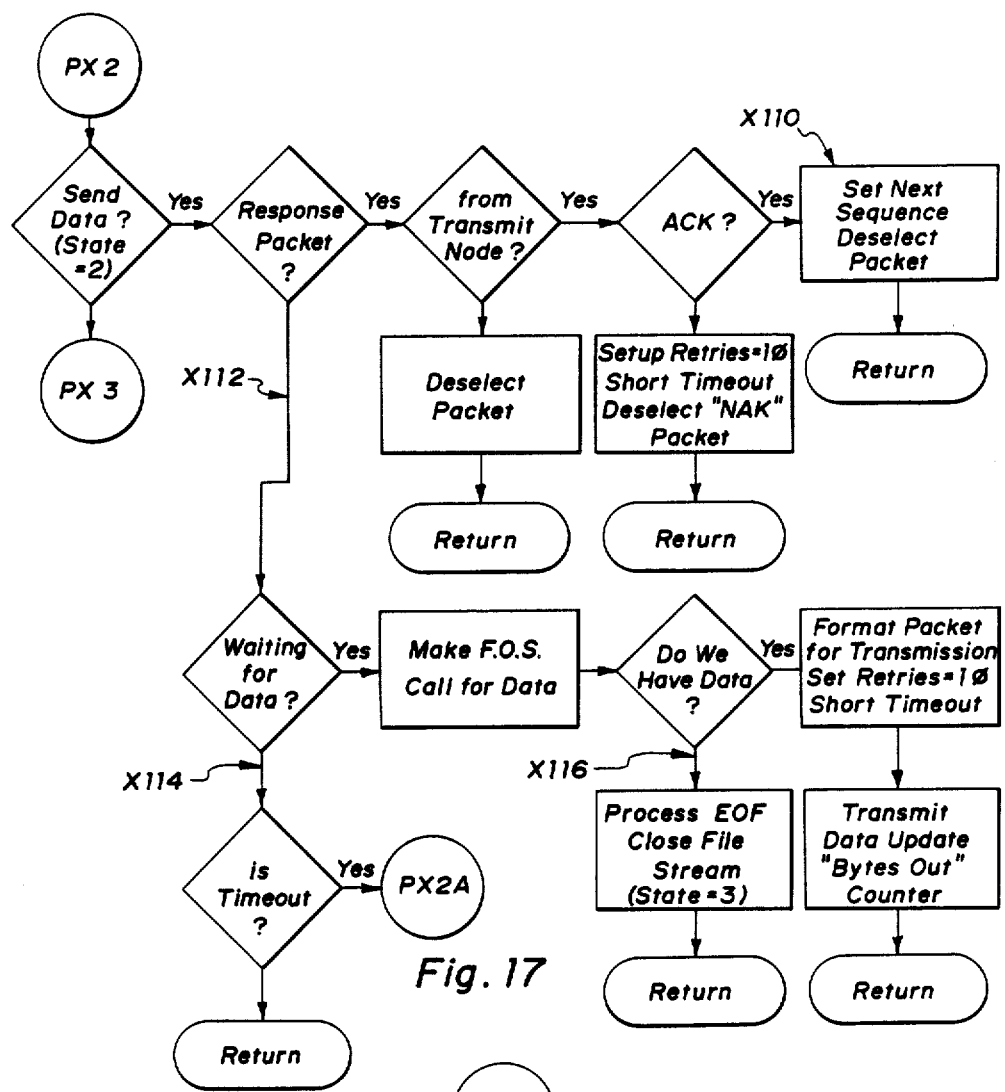
FIG. 17 is a continuation of the flow chart depicting the operation of the Process Transmit routine.
Figure 18:
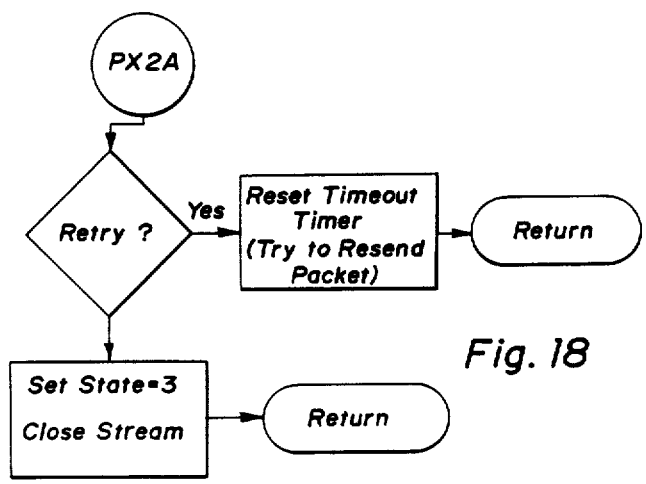
FIG. 18 is a continuation of the flow chart depicting the operation of the Process Transmit routine.
Figure 19:
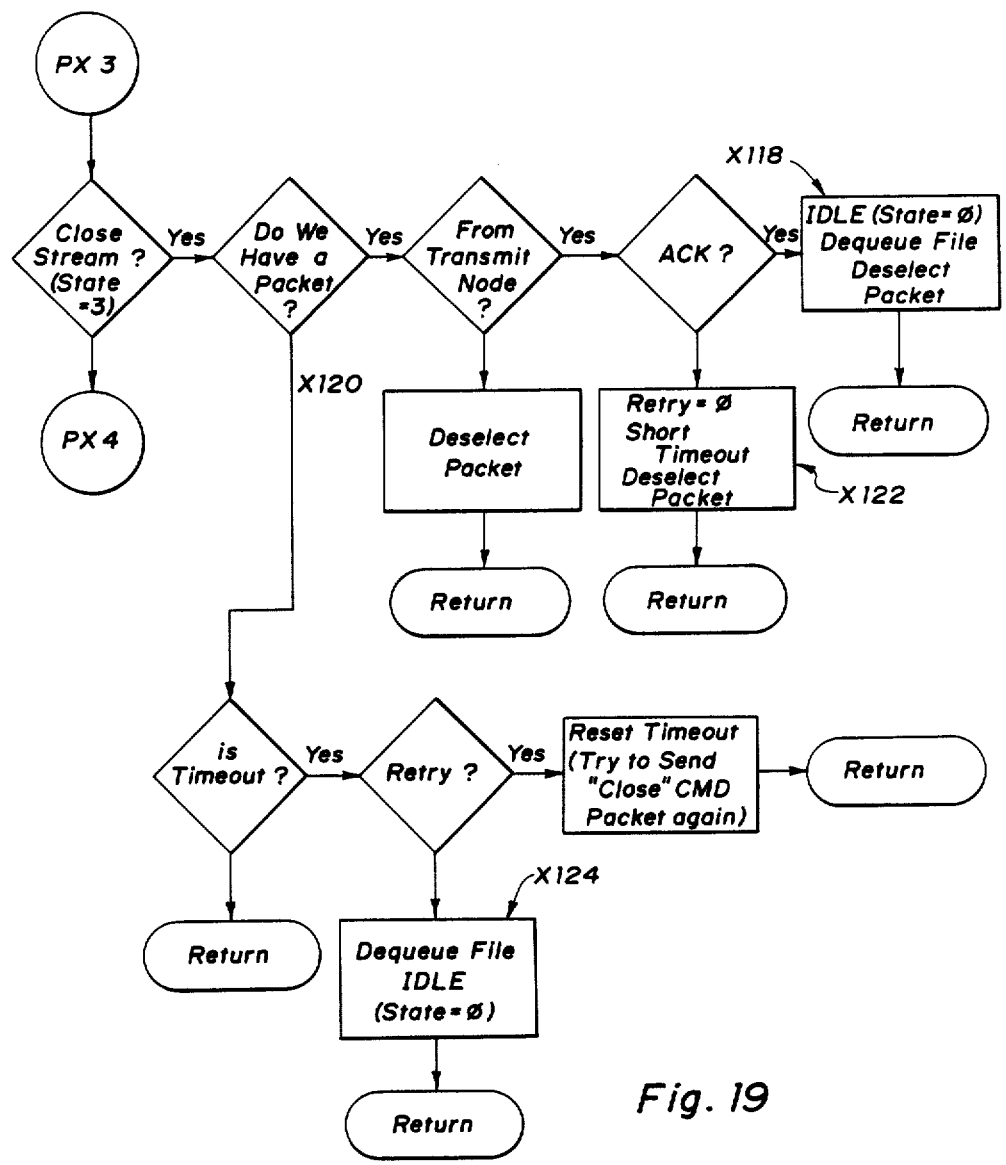
FIG. 19 is a continuation of the flow chart depicting the operation of the Process Transmit routine.
Figure 20:
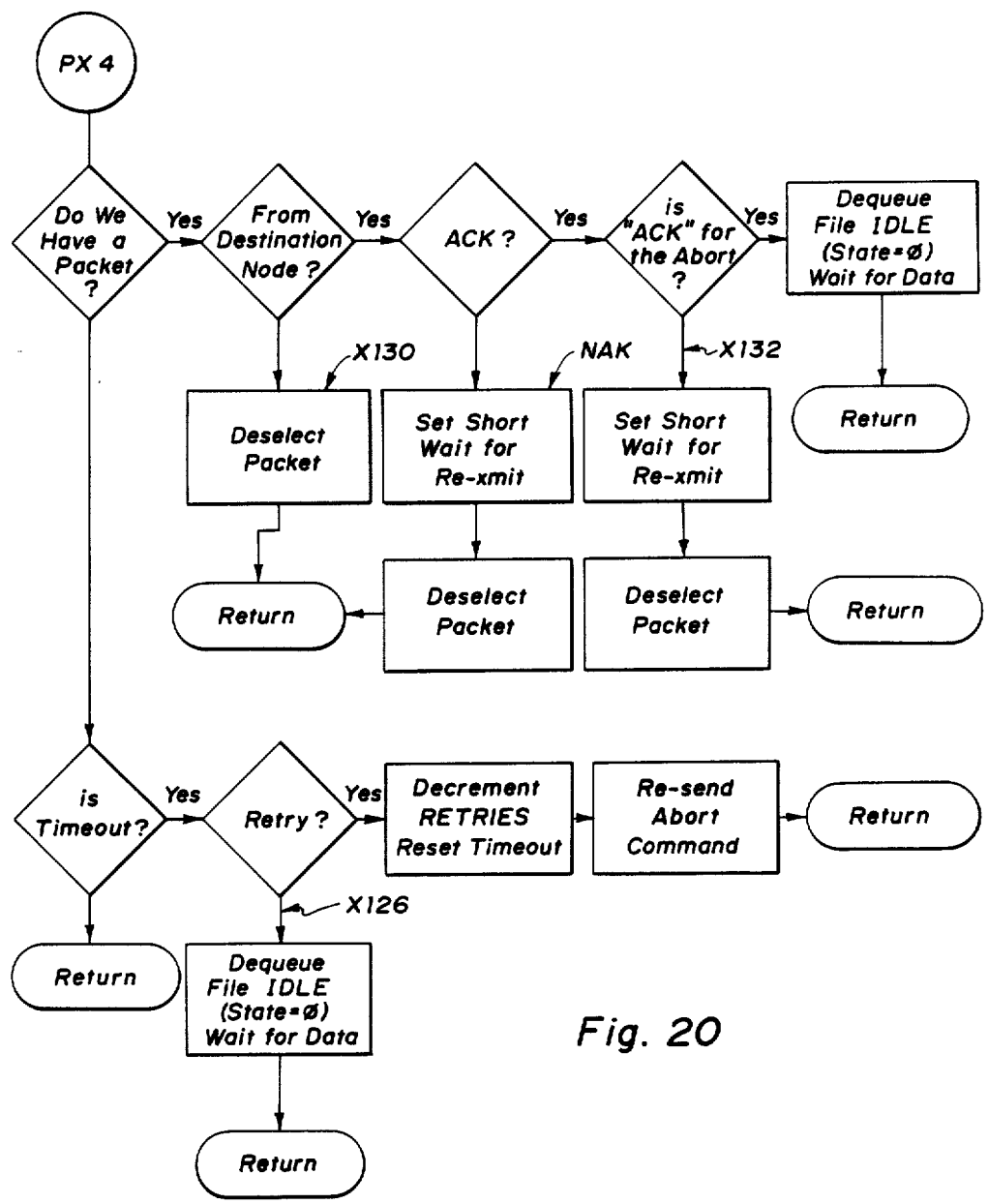
FIG. 20 is a continuation of the flow chart depicting the operation of the Process Transmit routine.
Figure 21A:
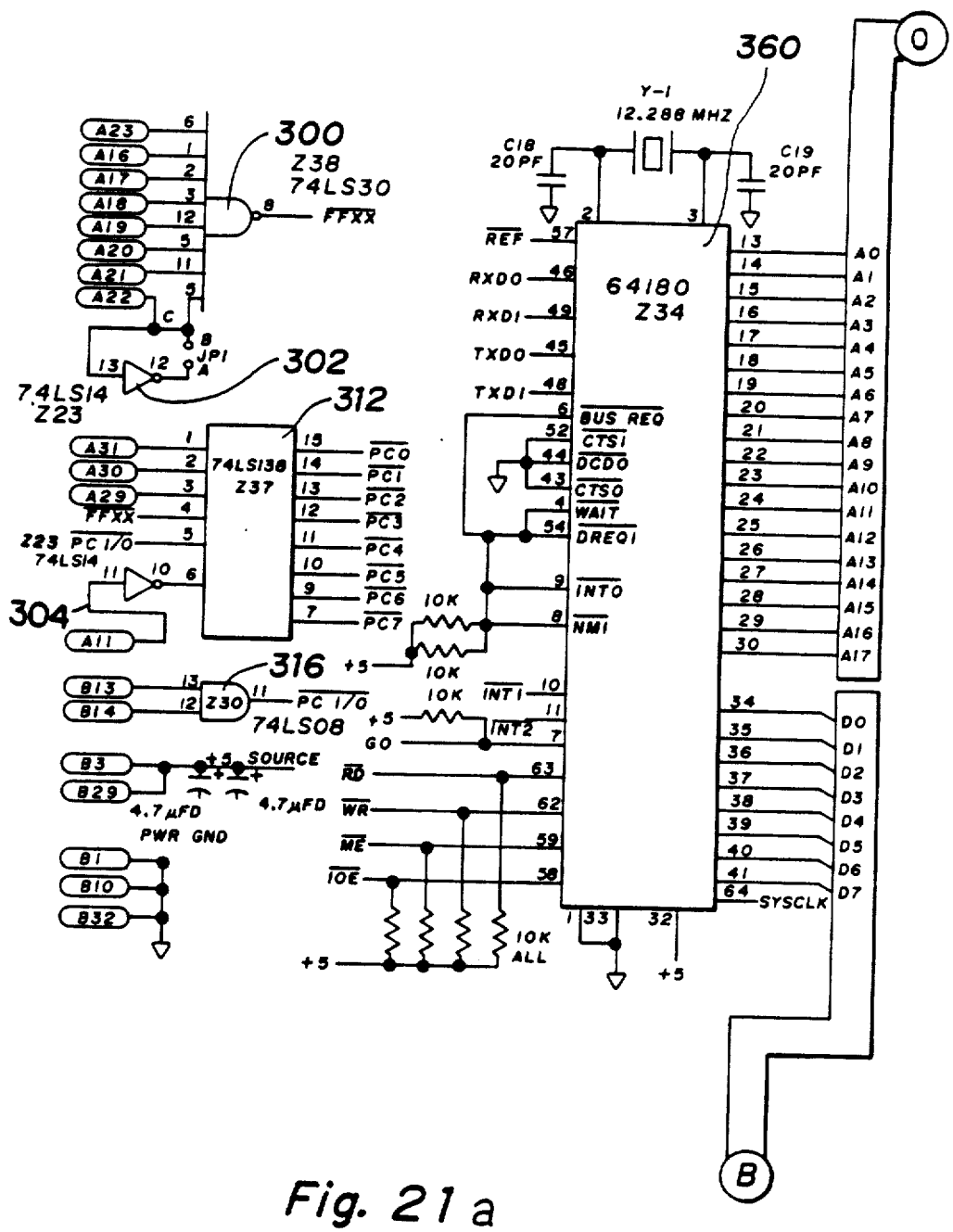
FIG. 21a is a partial schematic of the circuit board layout for the system of the present invention.
Figure 21B:
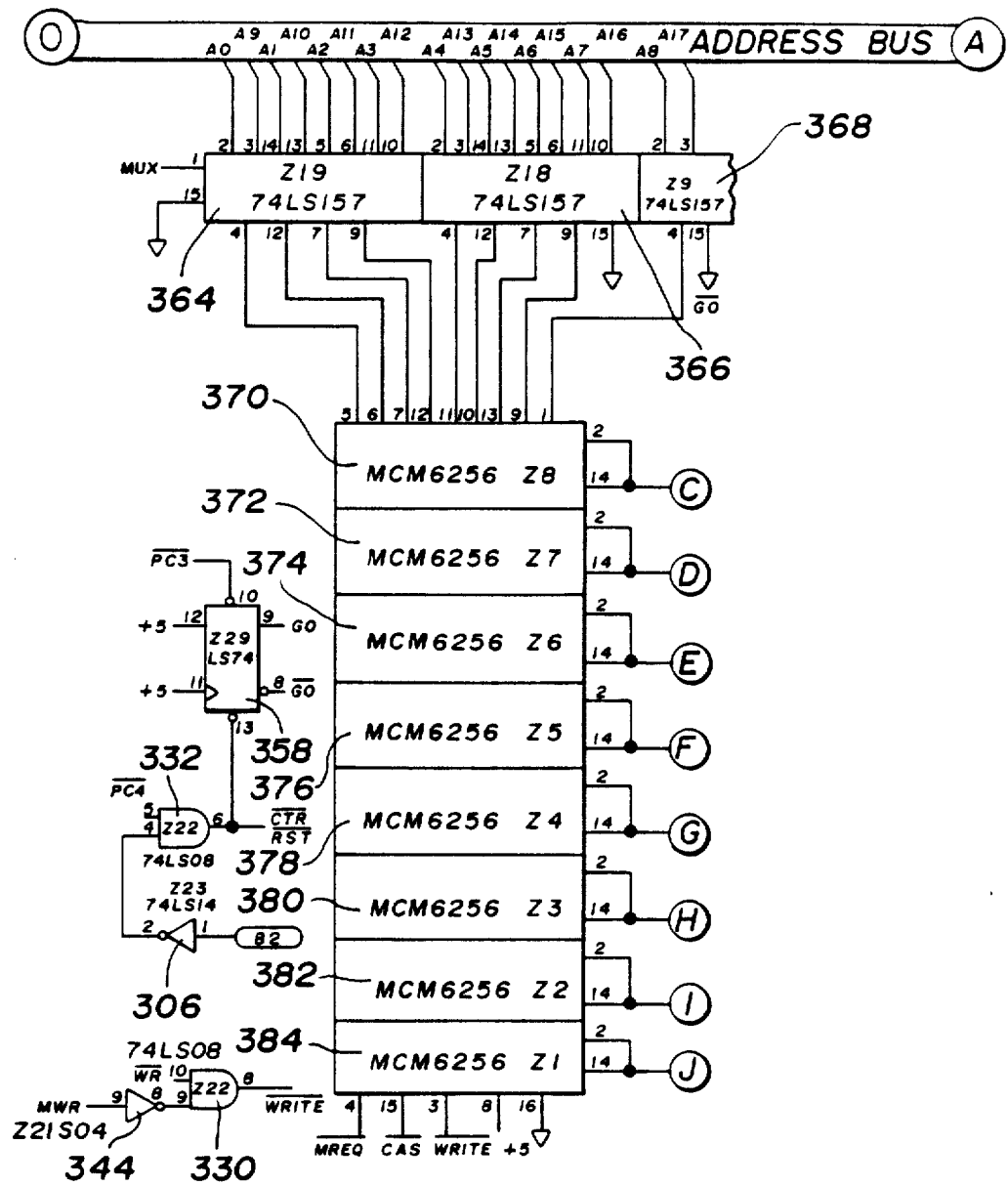
FIG. 21b is a partial schematic of the circuit board layout for the system of the present invention.
Figure 22:
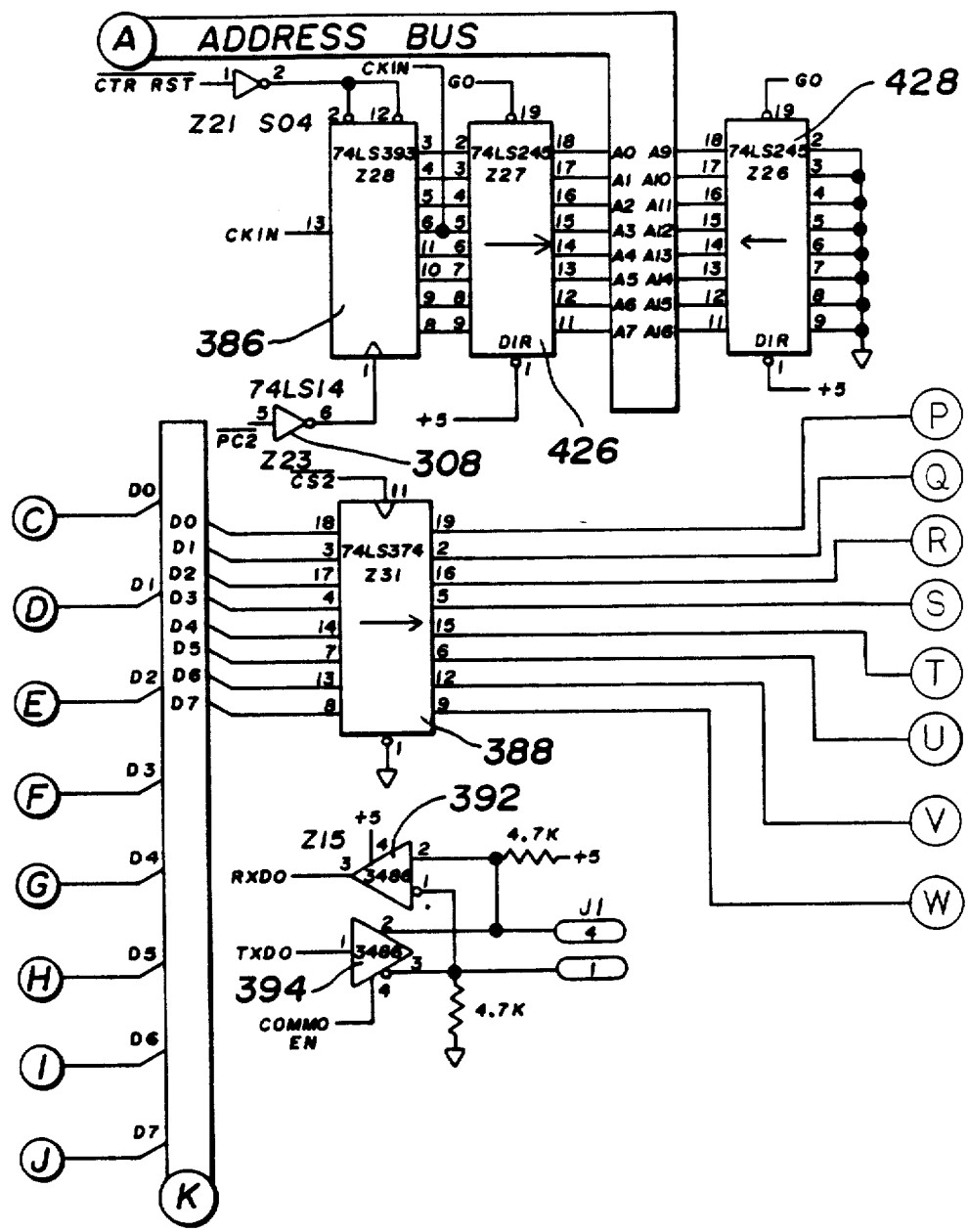
FIG. 22a is a partial schematic of the circuit board layout for the system of the present invention.
FIG. 22b is a partial schematic of the circuit board layout for the system of the present invention.
Figure 22:
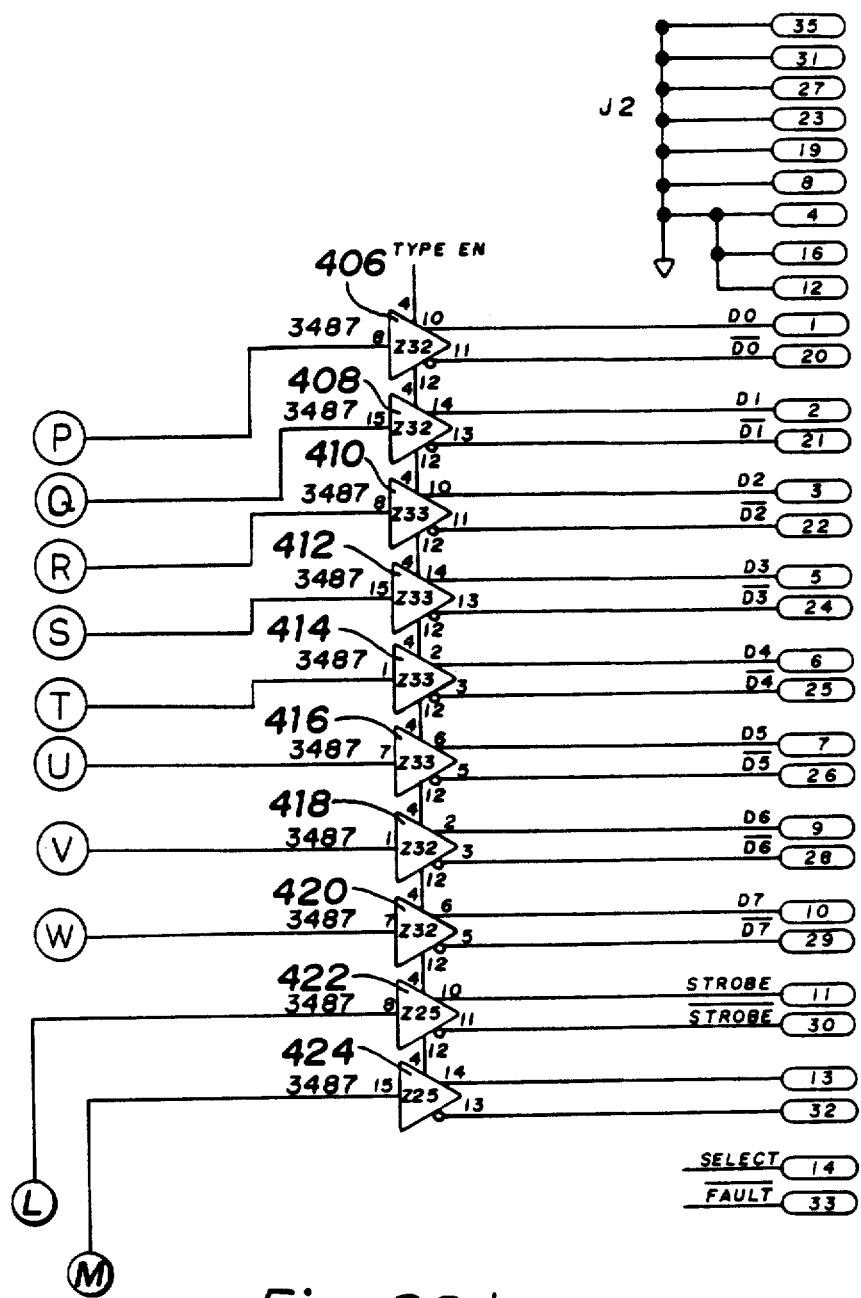
Figure 23:
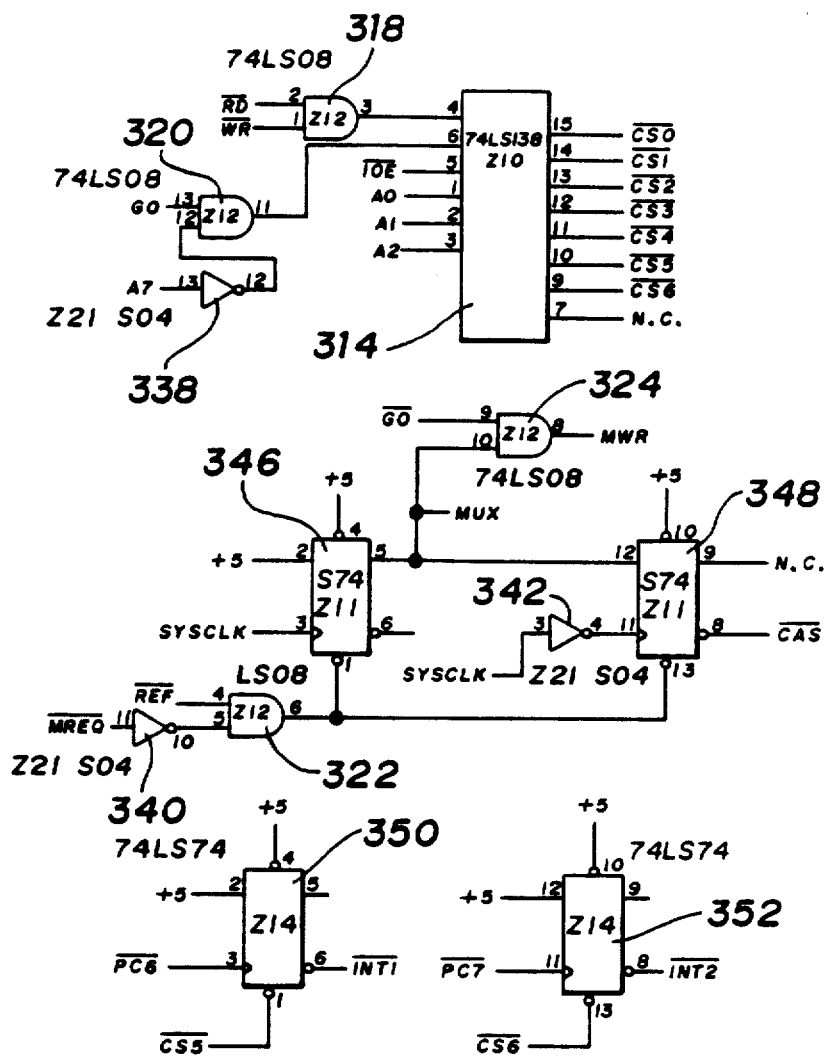
FIG. 23a is a partial schematic of the circuit board layout for the system of the present invention.
FIG. 23b is a partial schematic of the circuit board layout for the system of the present invention.
Figure 23:
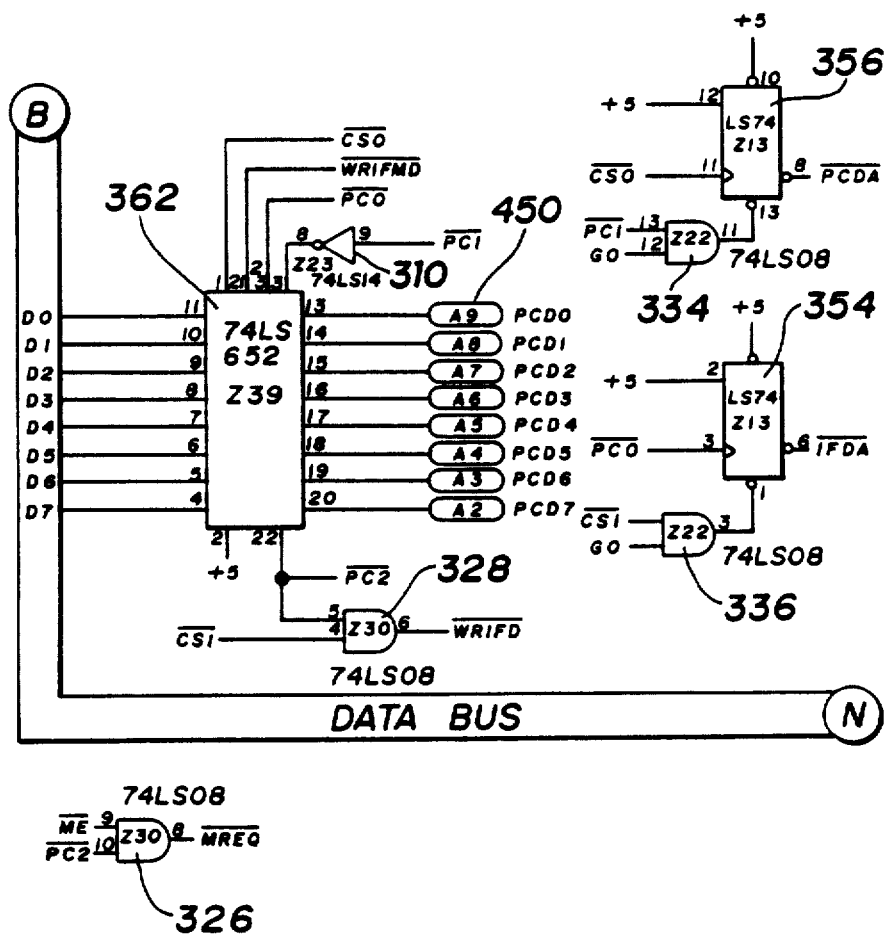
Figure 24A:
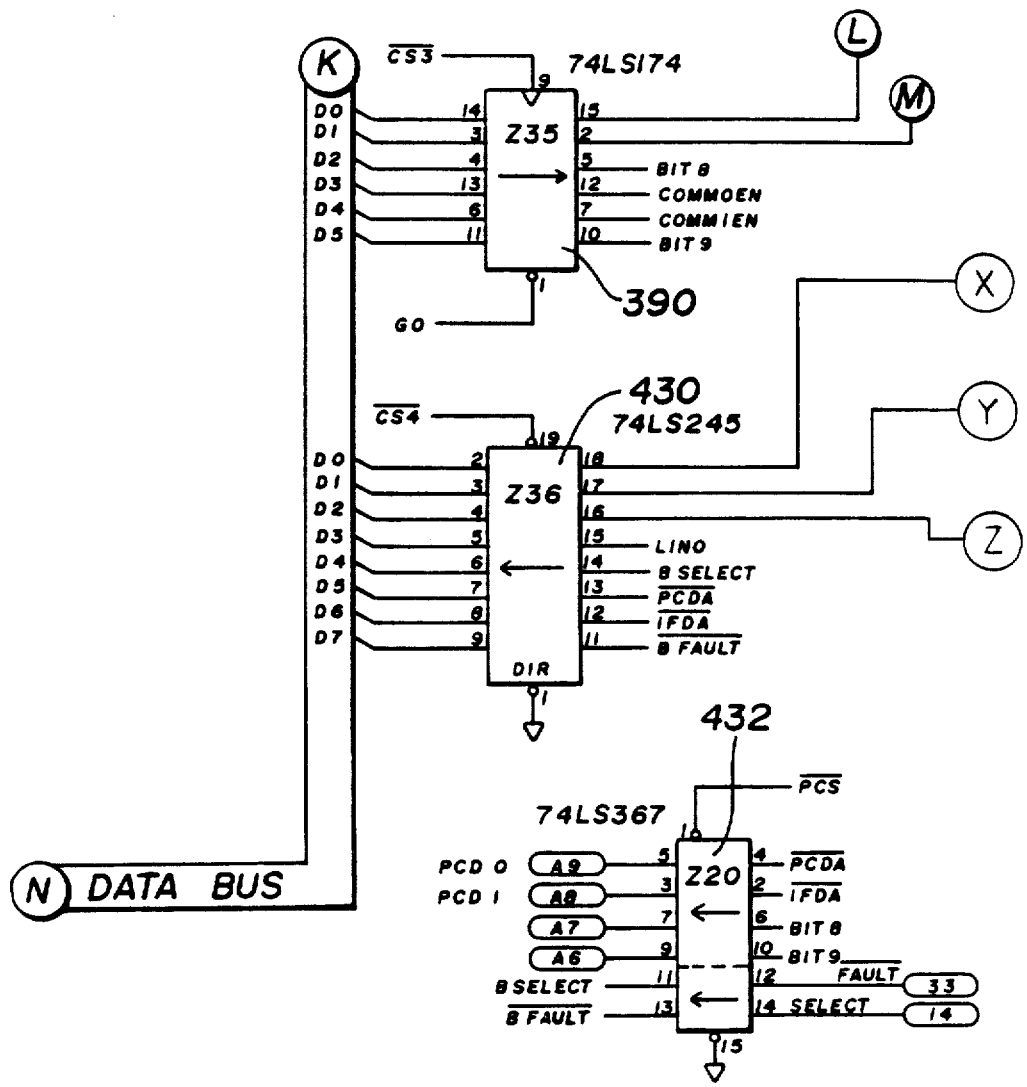
FIG. 24a is a partial schematic of the circuit board layout for the system of the present invention.
Figure 24:
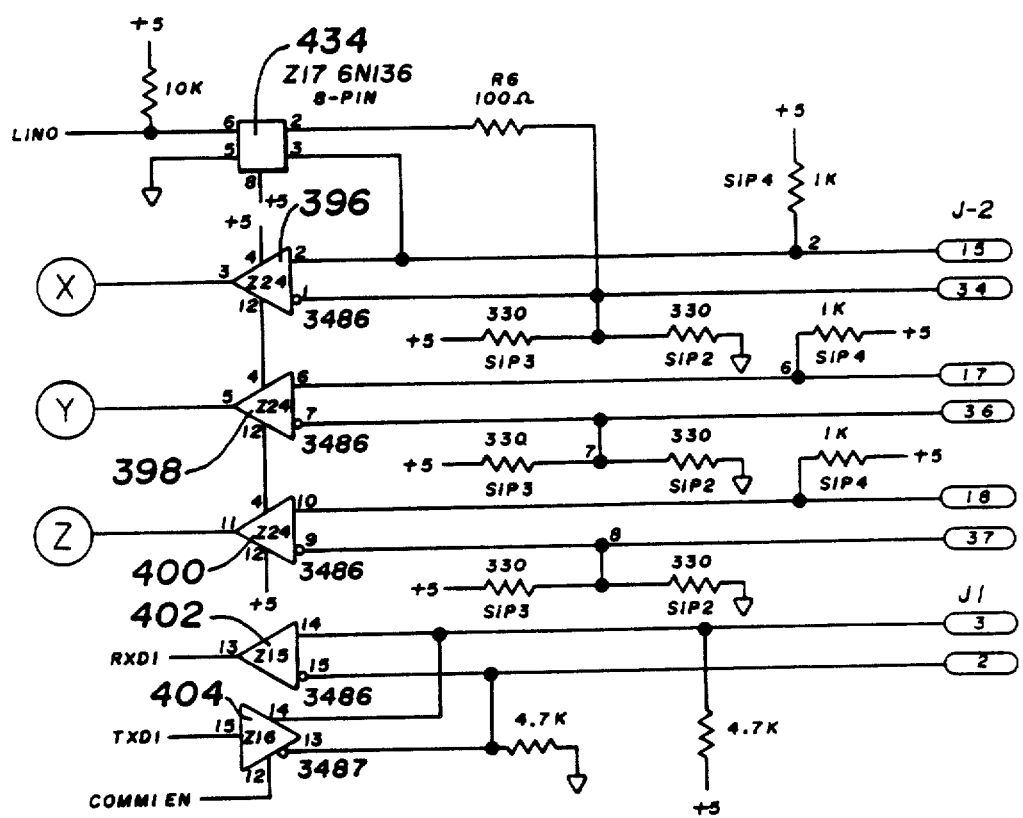
FIG. 24b is a partial schematic of the circuit board layout for the system of the present invention.

Referring to FIGS. 4 and 7, the logical link control (LLC) 84 employs a series of software routines which, in conjunction with the FOS 60, ensure that data transmitted over the network intended for this node is properly stored in the memory 76 on the board for subsequent code conversion and transmission to the electronic typesetter. The LLC 84 also ensures that the data intended to be transmitted by this node to other nodes on the network is properly buffered in the IDMAU 82 for transmission as soon as the lines are open.

FIG. 7 depicts the general organization of the LLC 84. The LLC 84 first determines whether the eight buffers in the IDMAU 82 are full. If these buffers are already full the LLC 84 waits until the data in at least one of the buffers is actually transmitted before processing. When one of the eight buffers in the IDMAU 82 is empty, the LLC 84 determines whether there are any 128 packs of data received from the network. If a byte received pack exists, the LLC 82 determines whether this mode is the destination node. If this is not the destination node, the LLC 84 clears the data in that buffer and continues (at L102) processing.

If the data contained in the pack received by the IDMAU 82 is destined for this node, the LLC 84 calls the Process Receive subroutine which interrupts the incoming data and performs any operations necessary to receive and store the data on the board, such as opening a file for the data, loading the data into the board's buffers 76, and closing the data file after all data has been received. The operation of the Process Receive routine is hereinafter disclosed in greater detail in connection with FIGS. 8–12.

If there are no received packs of data in the eight buffers on the IDMAU 82, the LLC 84 increments (at L120) a node-to-serve pointer corresponding to one of up to the 31 other nodes on the network. During this pass through the LLC routine, a check is made to determine whether the node corresponding to the current value of the pointer requires service from this node. If service is required, the Process Idle routine ensures that any partial blocks of data previously transmitted by the node corresponding to the current value of the pointer and residing in the buffers in the IDMAU 82 are written to the interface board's buffers 76 as soon as practicable. Details of the Process Idle routine are discussed hereinafter in connection with a description of FIGS. 13 and 14.

If the node corresponding to the current value of the pointer does not require service by this node, the LLC 84 calls the Process Transmit routine (at L104). This routine performs the functions necessary to transmit any files from this node to any of the other nodes on the network including establishing a "stream open" condition on the network for transmission of the data, notifying the destination node that data is about to be transmitted from this node, transmitting the data from the selected file from memory 76 in 128 byte packs to the buffers on the IDMAU 82 for transmission on the network, and signaling the destination node when the file being transmitted is closed. The operation of the Process Transmit routine is disclosed in further detail in connection with a description of FIGS. 15–20.

As will become apparent from the following discussion, each of the major subroutines (including Process Idle, Process Receive and Process Transmit) are continuously accessed on a timed basis. The system utilizes two variables, TIMEOUT and RETRIES, which may be set by any of the subroutines, or by LLC or FOS, to establish a priority for the particular action which the called subroutine is required to perform.

For example, a calling subroutine may set TIMEOUT to a relatively large value, establishing that the called subroutine will continue waiting for a response from another node for a number of calls during the TIMEOUT period, despite not receiving a response on the first pass through the subroutine—until the response is received or the TIMEOUT decrements to zero. In addition, the calling routine may set the value of RETRIES to a relatively large number, indicating that even after time is out (i.e. TIMEOUT is decremented to zero), the value of RETRIES is decremented by one and TIMEOUT is reestablished at another preselected value.

Thus, by varying the magnitude of both TIMEOUT and RETRIES, the calling routines can control the amount of time a particular subroutine is called on to perform a particular task without interrupting the operation of the network. It should be noted that the called subroutines can then take a default action—for example, closing a file when an acknowledgment that data sent to another node has not been received for a specified period of time. The calling routine can then reissue its command if necessary, with a new set of values for TIMEOUT and RETRIES depending upon the priority set by the calling routine for this particular action.

It should also be noted that each of the Process Receive and Process Transmit subroutines monitor their own status by utilizing "STATE" variables. Thus, these subroutines can determine whether they are waiting to open a file, waiting to receive data, waiting to send data, etc. each time the subroutine is called, without reference to the calling routine or to other conditions in the system.

PROCESS IDLE

Referring to FIGS. 4, 13 and 14, Process Idle continually checks to determine whether there are open files. If there are any open files, Process Idle then determines whether the buffers in the IDMAU 82 contain any data packets indicated for the open file. If so, Process Idle then attempts to write (by calling a FOS "WRITE") the data blocks from the IDMAU 82 to the open file in memory 76.

If all the data remaining in IDMAU 82 is written at this time, Process Idle signals (at PI1A) to the system that all data has been written to memory and that no data is being held. If all of the held data is not being written to memory 76 on this task, Process Idle formats the remaining data for a later FOS "WRITE".

If Process Idle determines that there is an open file but that no old data is being held inthe buffers of the IDMAU 82, Process Idle then checks to see if time is out (i.e. TIMEOUT=0). If so, Process Idle then checks to see if a retry is indicated (i.e. RETRIES 0). If a retry is indicated, Process Idle resets TIMEOUT, decrements RETRIES and returns. If a retry is not indicated, Process Idle dequeues (closes) the file. Thus, Process Idle continuously monitors the system to insure that any unwritten blocks of data temporarily stored in the buffers of the IDMAU 82 are written to the open file for which those unwritten blocks are intended.

PROCESS RECEIVE

Referring to FIGS. 4 and 8–12. Process Receive monitors incoming data on the indicated (the "current" data packet) in the IDMAU 82 and performs the operations necessary to receive and store that data in memory 76.

Process Receive performs various operations on the current data packet, depending on the following states of the process:
0 Idle (no file open)
1 Active (file open)
2 Holding (old data)

The number indicating each of the states is typically set by the Process Receive subroutine (usually during the last pass through the subroutine). However, the state number may be set or varied by the calling routine.

Process Receive first selects the current packet from the buffer in the IDMAU 82. A longitudinal redundancy (data error) check is then performed. If a data error is discovered, Process Receive issues a response to the source node that the data is bad, signalling that the data needs to be retransmitted. Process Receive then "de-selects" the data. As used herein, "de-selects" means the data packet is cleared from the packet buffer in the IDMAU 82 without further reading or writing of the data.

Process Receive then gets the command code or response sent with the current data packet. If a response code has been sent, it is passed to Process Transmit and Process Receive returns to the calling routine. It should be noted here that when the response code is sent to Process Transmit, the data packet is not de-selected, so that Process Transmit can further process this data.

If the data is a command code (at R102), Process Receive selects the indicated file then checks the status of the indicated file. If the file is currently open (state=1), Process Receive performs (at PR1A) as follows:

If the command is a NO-OP, Process Receive sends an acknowledgment of receipt of the NO-OP command and de-selects the data packet and return to the calling routine;

If the command is an OPEN, Process Receive acknowledges receipt of the OPEN command but does nothing further, because the indicated file is already open. Process Receive then de-selects the data packet and returns to the calling routine;

If the command is a CLOSE command, Process Receive closes the source file, acknowledges receipt of the CLOSE command, de-selects the data packet and returns to the calling routine;

If the command is ABORT, Process Receive deletes the file that is open, acknowledges that it has received a ABORT command, de-selects the data packet and returns to the calling routine; and If the command is none of the above commands, Process Receive sends an "illegal command" message over the network, de-selects the data packet and returns to the calling routine.

When Process Receive determines the current packet contains data indicated for an open file (at PRIB), the status of the other buffers in the IDMAU 82 are checked to determine whether data from a previous transmission is being held for entry into the file. If so, Process Receive attempts to write (by calling a FOS "WRITE") the old data to the open file. If this data write is successful, Process Receive continues processing the current packet of data. If the attempted write of the held data is unsuccessful, Process Receive transmits a "write failure" message to the system and returns. It should be noted that the current data packet is not de-selected here (at R104). Instead, the current data packet remains selected, and will be held for entry as old data on the next pass through Process Receive.

Once all the held data has been written to the source file, Process Receive extracts the data from the current data packet and attempts (at PRX) to write that data to the file. If none of the data is written to the file, Process Receive sets the state equal to 1, indicating that the file is open and that no data is being held, issues a message to the system that a data write has not been performed, and then returns to the calling routine. Again, it should be noted that (at R106) the data packet is not de-selected so that process receive will automatically attempt to write that data packet on the next pass through the subroutine.

If at least a portion of the data packet is written to the file, Proces Receive then determines whether the entire packet was written to the file. If so, the Process Receive sets the state equal to 1 indicating that the file is open and that no data is being held, issues a message to the system acknowledging that the data write was performed, de-selects the data packet and returns to the calling routine.

If only a portion of the data packet was written to the file, Process Receive (at R108) sets the state equal to 2, indicating that some of this data packet is being held (in a buffer in the IDMAU 82), issues a message indicating that data has been written to the file, de-selects the data packet and returns to the calling routine.

Process Receive performs the following operations (at PR2) if it has been determined that the file is not yet open:

If the command in the data packet is a NO-OP, Process Receive sends a message acknowledging that the NO-OP command has been received, de-selects the data packet and returns to the calling routine.

If the command in the data packet is an ABORT command, Process Receive sends a message acknowledging that it has received the ABORT command, de-selects the data packet and returns to the calling routine.

If the command is an OPEN command, Process Receive extracts the name (or number) of the indicated file from the data packet and attempts to open a file. If the new file is successfully opened the file is then queued on the typesetter queue, a message acknowledging that the file has been opened is sent to the source node, the data packet is de-selected and Process Receive returns to the calling routine.

If the attempt to open the file is unsuccessful, Process Receive (at R110) sends a message to the source node indicating a failure to open the file, de-selects the data packet and returns to the calling routine.

If a file has not been opened and none of the above commands have been received, Process Receive sends a message indicating that the command received is a "bad command", de-selects the data packet and returns to the calling routine.

PROCESS TRANSMIT

Referring now to FIGS. 4 and 16–20, the Process Transmit subroutine performs the operations necessary to transmit any files from this node to any of the other nodes on the network, including establishing a "stream open" condition on the network for transmission of the data, notifying the destination node that data is about to be transmitted from this node, transmitting the data from the selected file in memory 76, and signaling the destination node when the transmission is complete.

Process Transmit performs various operations on the selected data packet in the indicated buffer number of the IDMAU 82 depending on the following states of the process:

0 Idle
1 Request Stream Open
2 Data Send
3 Request Stream Close
4 Abort Process

The number indicating each of the states is typically set by the Process Transmit subroutine (usually during the last pass through the subroutine). However, the state number may be set or varied by the calling routine.

When Process Transmit is called, Process Transmit first determines whether it is in the Idle state. If currently inthe Idle state, Process Transmit ignores and discards any data packets containing a response from another node. Process Transmit then determines if there is a file to be transmitted. If not, the subroutine returns to the calling routine.

If there is a file to be transmitted, Process Transmit then sets its state variable at 1, indicating that a Request Stream Open is necessary (at X102). RETRIES is set to 10, the file name (or number) is stored for reference, a data packet containing a Request Stream Open command is transmitted to the destination node, and the subroutine returns to the calling routine.

If Process Transmit is in Request Stream Open state, the subroutine determines whether there is a response packet sent from the destination node. If there is no response packet pending, the subroutine determines whether time has run out. If time has not run out, the Process Transmit returns to the calling routine. If time is out, Process Transmit then determines whether RETRIES is greater than 0. If RETRIES is greater than zero, Process Transmit reduces the RETRIES by one, sets up a transmit request (as at X102) and resets the TIMEOUT and RETRIES values. It should be noted that the TIMEOUT value is set to a relatively short period of time during the initial number of retries, and set to a relatively longer period of time for later retries. The length of the timeout is varied because it is assumed that if time has run out before the Request Stream Open signal has been successfully transmitted to the destination node and acknowledged by that destination node, the destination node is probably busy processing. Therefore, the TIMEOUT period is lengthened to allow the destination node to finish whatever other processing is being performed.

As will be appreciated by those skilled in the art the values of RETRIES and TIMEOUT can be similarly varied by calling subroutines to establish the degree of priority to the calling subroutine of the particular action requested of the called subroutine. The various values of RETRIES and TIMEOUT should be selected to optimize the interaction of each of the interfaces on the network, and may be dependent upon the number of personal computers in the network, the number of electronic typesetters in the network, and the level of activity at each of the various nodes of the network.

At this point (X104), Process Transmit returns to the calling routine.

If retries equals zero (that is, this Request Stream Open has been attempted unsuccessfully for the maximum number of times), Process Transmit dequeues the file to be transmitted and returns to the Idle state.

Note that under these circumstances, the calling routine (usually FOS) must determine, through a similar priority scheme utilizing time-outs and retries, whether it wishes to call Process Transmit to again attempt to transmit that file to the destination node. If the calling routine does again initiate a request to transmit that file, the next time Process Transmit is entered it will be in the Idle state, and the sequence will begin anew.

If there is a data packet containing a response, Process Transmit then determines (at PX1A) if the data packet is a response from the destination node. If it is, Process Transmit then determines whether the response is an "Acknowledge". If the response is an "Acknowledge" by the destination node, Process Transmit sets its state equal to 2, indicating that it should send data to the destination node on the next pass through the Process Transmit subroutine. Process Transmit then de-selects the current packet and returns to the calling routine.

If (at X108) Process Transmit determines that the data packet is not a response from the destination node, the packet is de-selected and Process Transmit returns to the calling routine. Again it should be noted that Process Transmit has prioritized its operations, de-selecting all incoming response packets except for the response from the destination node to which it is currently attempting to transmit a file.

If Process Transmit determines that it is neither in the Idle nor in the Request Stream Open state, it then determines (at PX2) whether it is in the Send Data state. If so, Process Transmit then determines whether the selected data packet is a response from another node. If it is, process received determines whether the response is from the destination node. If the response is from the destination node, Process Transmit determines whether that response is in acknowledge. If the destination node has sent an "Acknowledge," Process Transmit (at X110) assumes that the previous data packet transmitted was received by the destination node, identifies the next block of data to be transmitted, and returns to the calling routine.

If no response packet is received (at X112), Process Transmit then determines whether it is waiting for the next data block (from FOS) of this file to be transmitted. If it is, Process Transmit issues a call to FOS (i.e., a FOS "Read") for the next data block from the file. If FOS returns the data block, Process Transmit formats a data packet for transmission to the destination node, sets RETRIES at 10 and sets a short TIMEOUT.

Process Transmit then transmits the data packet and updates a counter indicating the number of bytes transmitted from this file. The value in this counter may be published on the screen, giving the operator an indication of the progress of the transmission of the file to its destination node.

If Process Transmit is not waiting for data (at X114), it determines whether time is out. If time is out, Process Transmit (at PX2A) then determines whether there are any retries left. If there are retries left, Process Transmit resets Timeout value, decrements the value of RETRIES in order to make another attempt at transmitting the next block of data from this file, and returns to the calling routine. If there are no retries left (i.e. RETRIES equals zero), Process Transmit sets its state at Request Stream Close (i.e., it gives up in its attempt to transmit this file) and returns to the calling routine.

If (at X116) Process Transmit determines that it does not have data to transmit, the system assumes it has reached the end of the file and sets its state to Request Stream Close, so that, at the time of the next pass through the Process Transmit subroutine the necessary operations are performed to indicate to the destination node that the entire file has been transmitted. Process Transmit then returns to the calling routine.

If Process Transmit determines that it is not in Idle, Request Stream Open, or Send Data states, it determines whether it is in Request Stream Close state (at PX3). If so, Process Transmit then determines whether the current data packet is a response received from another node on the system. If it is, Process Transmit then determines whether the response is an acknowledgement by the destination node that it received the previous data packet. If so, Process Transmit (X118) then transmits a data packet to the destination node indicating the file is closed (Dequeues the file), sets its state to Idle and de-selects the current response packet and returns to the calling routine.

If Process Transmit determines that it does have a response, but the response is not from the destination node, Process Transmit (at X120) de-selects the response packet and returns to the calling routine. Thus, at this point, Process Transmit is waiting only for a response from the destination.

Similarly, if the response from the destination node is not an acknowledge, Process Transmit (at X122) sets RETRIES to 10, sets its TIMEOUT to be relatively short and de-selects the response packet. Again, since the response it received was not an acknowledgement from the destination node that it received the last packet of data transmitted by this node, Process Transmit returns to the calling routine and waits (for the number of passes through Process Transmit equal to the value of RETRIES) to receive that acknowledgement.

If Process Transmit determines that there is no current data packet, Process Transmit determines whether time is out. If time is out and there are no more retries left, Process Transmit (at X124) then transmits a data packet indicating to the destination node that this node has completed its transmission of the indicated file, sets its state to Idle, and returns to the calling routine.

If Process Transmit is not in the Idle, Request Stream Open, Send Data or Close Stream states, Process Transmit (at PX4) defaults to the Abort state (State=4). At this point, Process Transmit determines whether there is a current packet in the packet buffer. If there is no packet in the packet buffer, Process Transmit determines whether time is out. If time is not out, Process Transmit simply returns to the calling routine.

If time is out (TIMEOUT=0), Process Transmit determines whether RETRIES is greater than zero. If it is, Process Transmit decrements RETRIES, resets TIMEOUT and re-transmits a packet containing the "ABORT" command, and returns to the calling routine.

If time is out and there are no retries left (RETRIES=0) Process Transmit (at X120) dequeues the file, sets its state to Idle (State=0), sets a flag indicating that it is waiting for data and returns to the calling routine.

If Process Transmit determines that there is a data packet (at X122), it then determines whether the packet is from the destination node. If so, Process Transmit determines whether the packet is an "Acknowledge." If the information in the data packet is an "Acknowledge", Process Transmit determines whether the "Acknowledge" is for the "Abort" command previously transmitted by Process Transmit. If the "Acknowledge" is for an "Abort" command, Process Transmit dequeues the file being transmitted, sets its state to Idle (State=0), sets a flag indicating that it is waiting for data, and returns to the calling routine.

If there is a packet but the packet is not from the destination node Process Transmit (at X124) de-selects the packet and returns to the calling routine.

If there is a packet and the packet is from the destination node but is not an "Acknowledge", Process Transmit assumes that it has received a negative acknowledge from the destination node. Process transmit then sets a short wait for retransmission of the "Abort" command to the destination node, de-selects the current packet, and returns to the calling routine.

If Process Transmit determines that the "Acknowledge" is not for the "Abort" command transmitted by this node, Process Transmit (at X126) similarly sets a short wait for retransmission of the "Abort" command, de-selects the current packet and returns to the calling routine.

CODE CONVERT

The code conversion routine of the present invention performs character-by-character conversion and string conversion of character strings in a file, prior to transmission of the file to the electronic typesetter on that node or to another node in the network. Code Convert employs a pair of matched look-up tables of input strings and output strings corresponding respectively to the current coded format and the desired coded format. In the preferred embodiment, the input string table contains single characters, as well as character strings up to five characters in length, each matched with an output string of characters of any length.

The string conversion is performed on the characters of a selected file by extracting the characters in sequence from the file, preferably in groups of five characters. These characters are temporarily held in a buffer for comparison for an exact match with one of any of the strings in the input table. For example, the first five characters in the file being transmitted are buffered up and compared for a match, first with all character strings five characters in length, in the input table. If a match is found the output string corresponding to the five-character input string so matched is then output, the next five characters of the file being transmitted are pulled into the buffer and the conversion continues.

If the first five characters do not match any of the five-character strings in the input table, the first four characters are then compared for a match with any of the four-character strings in the input table. Again, if a match is found, the output string corresponding to that four-character input string is retrieved, output, and the next five characters to be compared—including the fifth, yet-to-be-matched character from the first string examined, are pulled into the buffer.

If no matches with the four-character string are found, the first three characters are then compared for a match with all the three-character strings in the input table. If a match is found the output string corresponding to the matched three-character input string is retrieved, output, and the conversion continues with the next five characters from the file. Again, the first characters of the next string will include any of the characters not matched in the previous string.

This process of reducing the length of the character string being compared (from five characters iteratively down to a single character) is repeated until a match with an input string of corresponding length is found.

As will be appreciated by those skilled in the art, Code Convert may initially examine the first character in the buffer to determine whether it is one of a select set of characters known to be converted on a character-by-character basis, so that the single-character conversion for those particular selected characters is performed without including that character in the above described string search.

While the preferred embodiment compares the characters of the file being transmitted with input strings of up to five characters, the length of the character strings in the input table might be altered without departing from the above described conversion method. Also, input strings of greater than five characters may be matched by employing a multiple-pass system of comparing, for example, up to five characters of the file being transmitted with a first table of input strings of up to five characters in length where some of the five-character strings in the first table of input strings represents the first five of a larger input string. Thus, for example, the five characters in the buffer might match two or more of the five character input strings in the first table. Code Convert will then employ a second input string table and examine the next five characters of the file to be transmitted for a match. The character strings compared in the second input string table correspond to the next characters in the strings beginning with the five character strings matched in the first input table. This comparison can be performed in the identical manner to the first comparison until a match is found. In this manner, input character strings of greater than five characters in length can be efficiently matched by examining groups of only five characters during each pass through the routine.

Each of the initial code formats to be converted, such as the ASCII codes, will employ a set of input string look-up tables matched with corresponding output string look-up tables for each of the coded code formats to be transmitted, such as TTS codes. Thus, the code conversion routine in the present invention can be customized for conversion from any one particular format to any other particular format by adding the appropriate set of input string and output string look-up tables, as well as the single character input and output look-up tables, for that particular conversion.

Thus, the personal computer/electronic typesetter interface of the present invention provides the operative of a personal computer page composition work station with the capability of routing text files prepared at the station to an electronic typesetter connected to the station, or any of a number of typesetters connected to other personal computers in the network. The system of the present invention will convert the format of the text files to a format recognizable by the target typesetter necessary, and will continually monitor the status of any files queued for output to the typesetter connected to the personal computer or to other typesetters in the network.

What is claimed is:

1. A personal computer/electronic typesetter interface for a personal computer having at least one expansion slot for accommodating additional circuit boards in an electronic typesetting network including a plurality of such interconnected personal computers, each personal computer including a main circuit board having a microprocessor, memory, a data input device and logic for preparing text files in a first coded format, and at least one electronic typesetting machine connected to one of the personal computers, said electronic typesetting machine including logic for typesetting text from text files in a second coded format, the personal computer/electronic typesetter interface including:

an expansion board including means for insertion in an expansion slot on each personal computer and means for electronic interconnection to the main circuit board, said expansion board including, a microprocessor;

a first input for receiving text files transmitted over the network to the personal computer in which the expansion board is inserted, a first output for transmitting text files from this personal computer to another selected personal computer in the network, a second output for transmitting text files received from other personal computers in the network or from this personal computer for output to the electronic typesetter connected to this personal computer, memory for storing text files to be transmitted via the first output in a first queue, memory for storing the files to be transmitted via the second output in a second queue;

logic for continuously monitoring the status of the files in each of the first and second queues;

logic for interrupting the operation of the microprocessor on the main circuit board of the personal computer and displaying the first and second queues of text files upon receipt of a preselected command by the data input device; and logic for converting the data contained in a text file from the the first coded format to the second coded format accepted by the typesetter connected to the personal computer to which the file is directed for output.

2. The interface of claim 1 including an off-site automatic initialization system having:

a pre-boot program stored in memory on the main circuit board including logic for establishing communication with the expansion board of the personal computer and logic for downloading to the expansion board any information necessary for operation of the expansion board; and the expansion board further including, a hardware loader for receiving the pre-boot program one byte at a time from the memory on the main board and logic for storing the pre-boot program in memory on the expansion board;

a switch for sustaining the microprocessor on the expansion board in a "reset" condition until the pre-boot program is loaded into memory on the expansion board; and logic for deactivating the switch, placing the microprocessor on the expansion board in "set" condition, and causing execution of the stored pre-boot program by the microprocessor on the expansion board.

* * * * *